Nov. 17, 1942.    W. C. WEBER    2,302,588
CLASSIFICATION
Filed Aug. 21, 1941    7 Sheets-Sheet 1
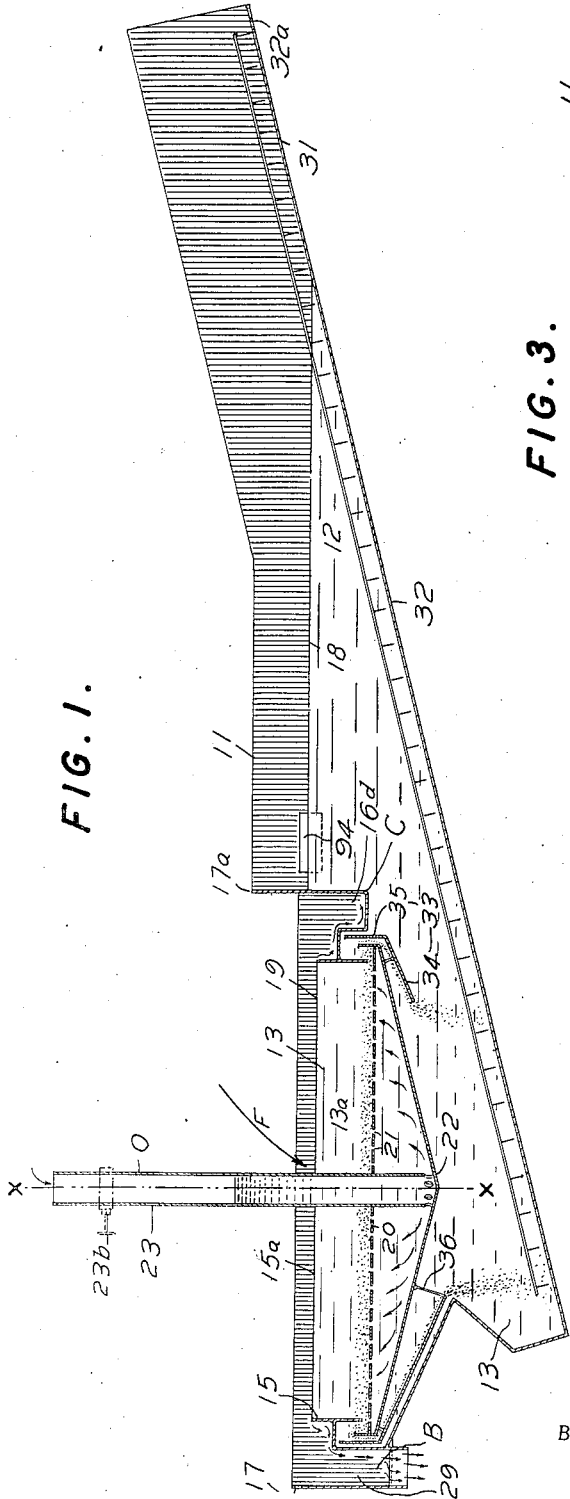
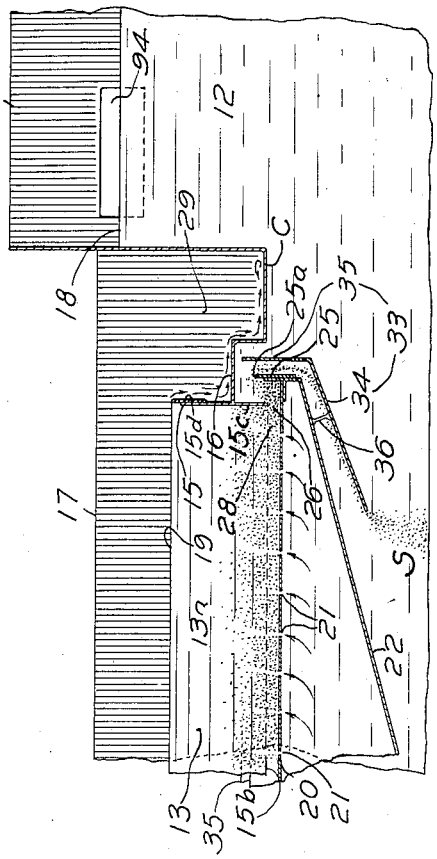
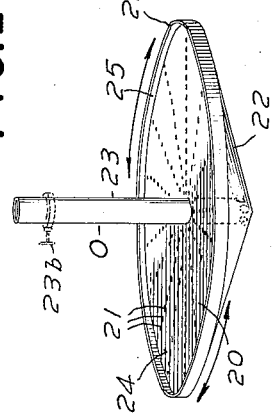
INVENTOR.
WILLIAM C. WEBER
BY
ATTORNEY.

Nov. 17, 1942.    W. C. WEBER    2,302,588
CLASSIFICATION
Filed Aug. 21, 1941    7 Sheets-Sheet 2

INVENTOR
WILLIAM C. WEBER,
BY
ATTORNEY.

Nov. 17, 1942.   W. C. WEBER   2,302,588
CLASSIFICATION
Filed Aug. 21, 1941   7 Sheets-Sheet 3
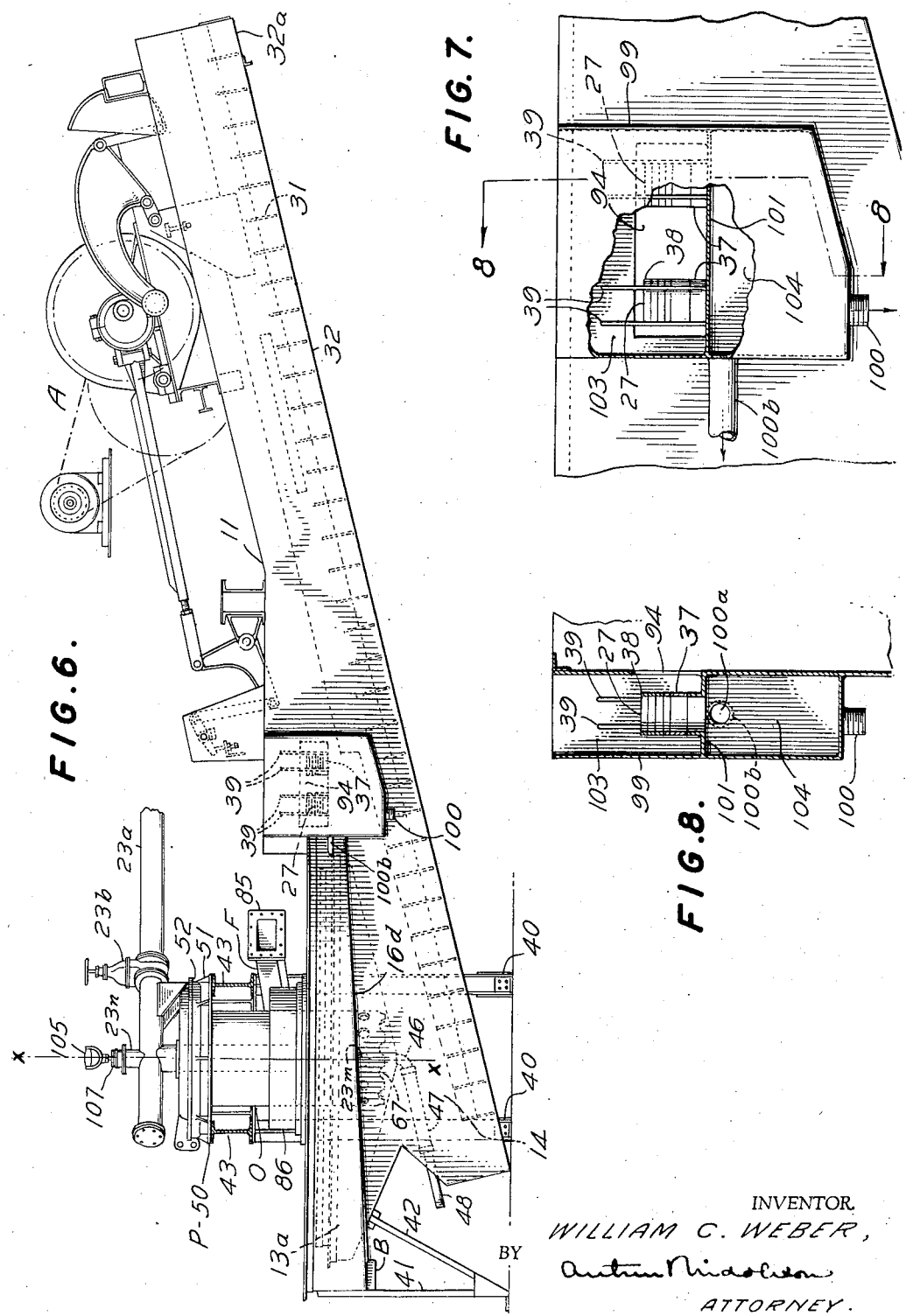
INVENTOR.
WILLIAM C. WEBER,
BY
ATTORNEY.

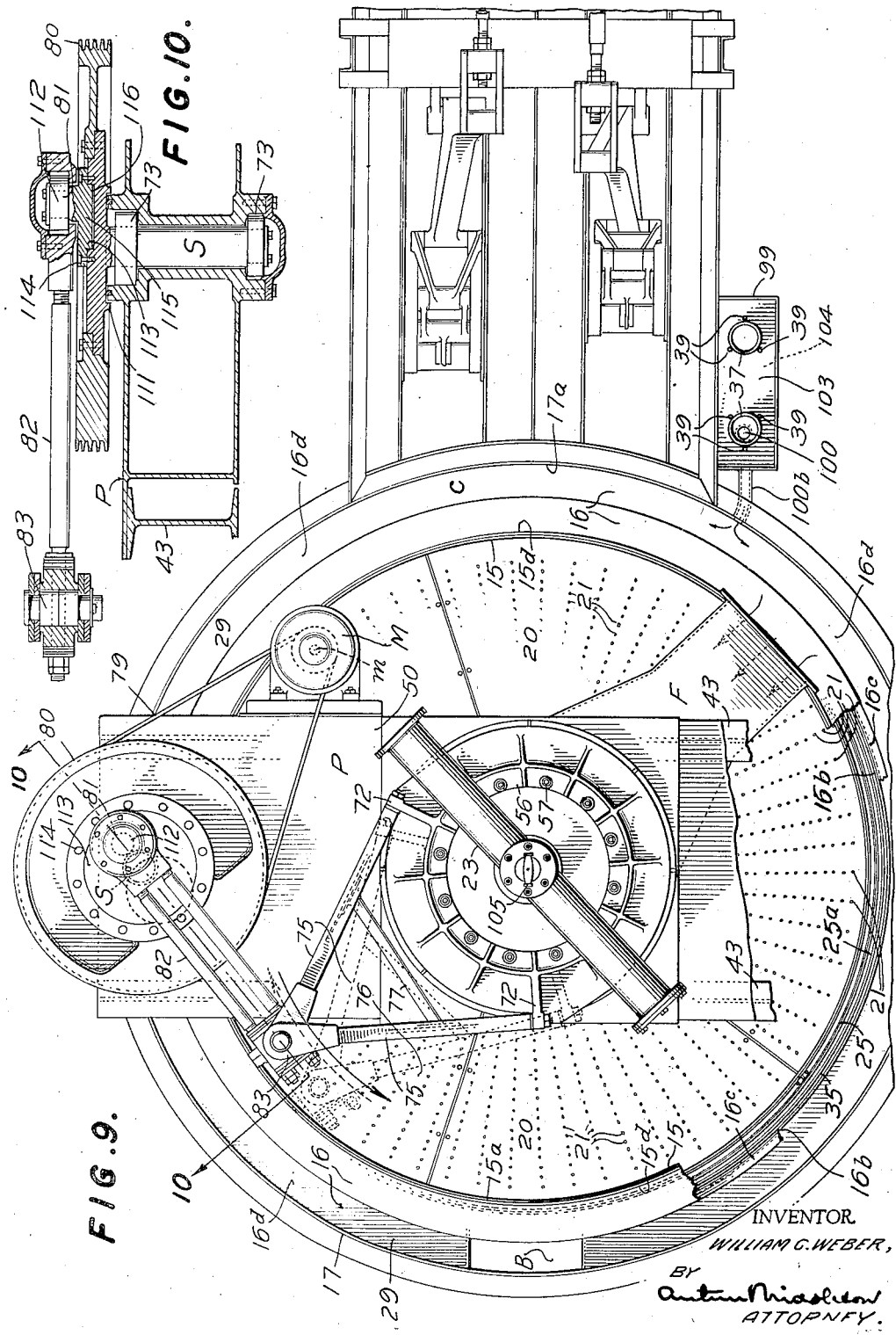

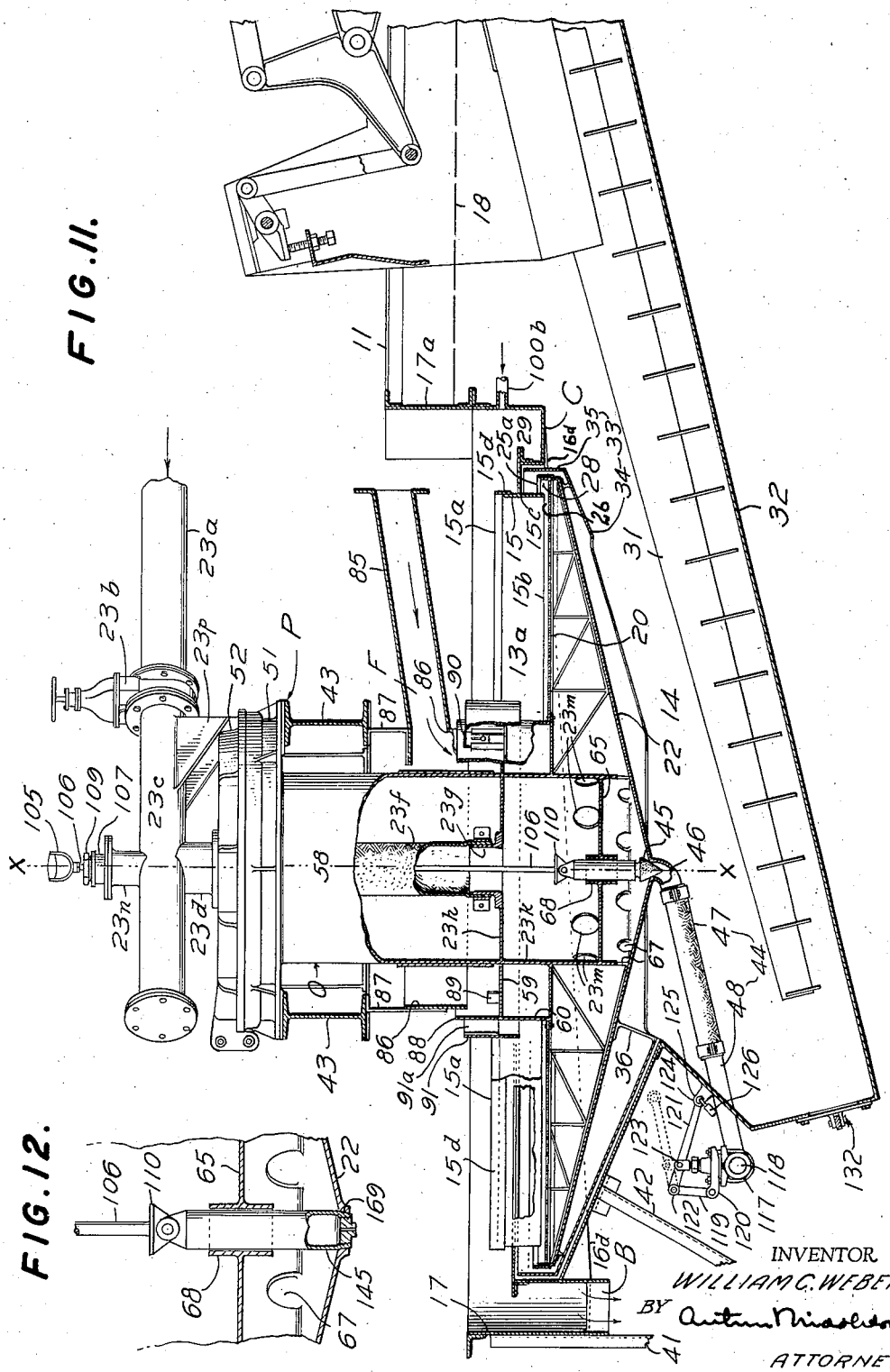

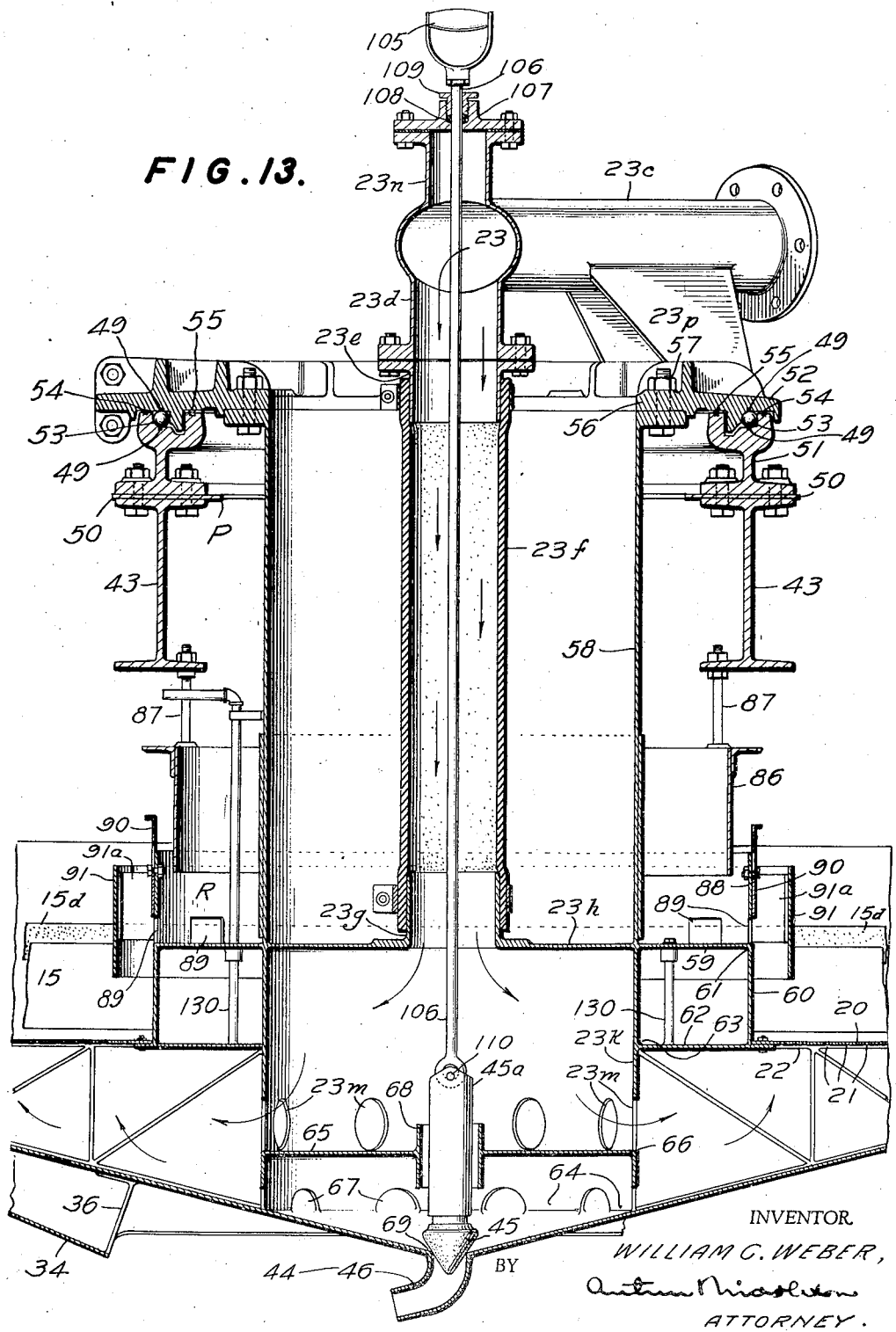

Nov. 17, 1942.     W. C. WEBER     2,302,588
CLASSIFICATION
Filed Aug. 21, 1941     7 Sheets-Sheet 7
FIG.14.
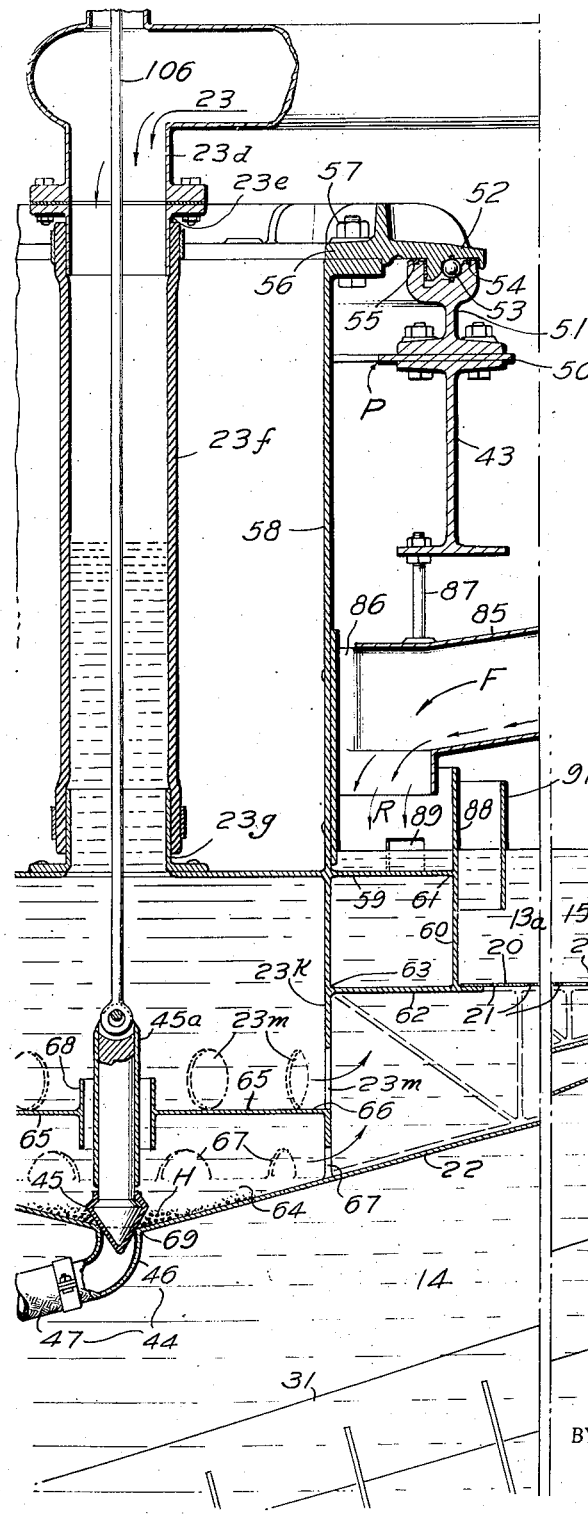
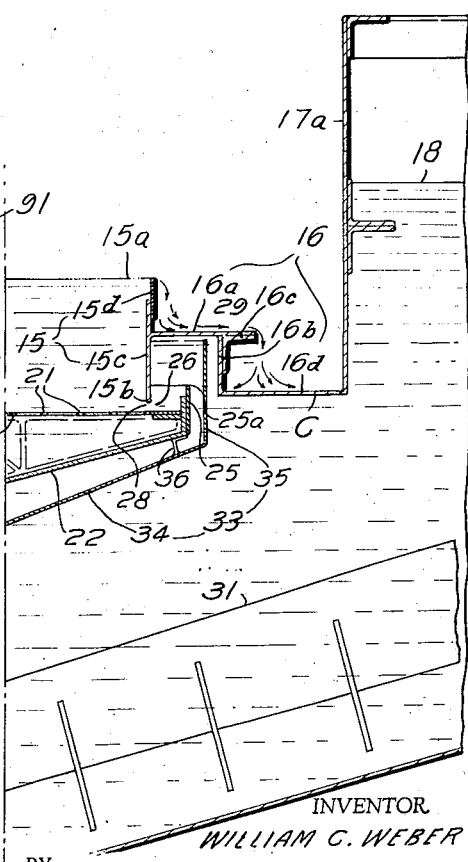
INVENTOR.
WILLIAM C. WEBER
BY
ATTORNEY.

Patented Nov. 17, 1942

2,302,588

UNITED STATES PATENT OFFICE 2,302,588

CLASSIFICATION

William Chambers Weber, Westport, Conn., assignor to The Dorr Company, Inc., New York, N. Y., a corporation of Delaware Application August 21, 1941, Serial No. 407,703

15 Claims. (Cl. 209—18)

This invention relates to the stratification or classification of suspended solids to fractionate them into groups or fractions based upon differentiations of their settling rates. Such classification of suspended solids finds usefulness in metallurgy, for example, where the discharge from a mill that grinds ore passes to a classifier or classification station where the sufficiently ground fine solids are separated out and passed to further treatment, whereas the coarser or insufficiently ground solids are separated and returned to the mill for re-grinding. Such separation is used in treating metalliferous ores. Likewise, rocks that are to be made into such products as cement, phosphates, as well as coal, can be separated into a plurality of fractions according to the invention hereof.

With the enormous tonnages of ore or rock being treated in present-day plants, it becomes important to make the classification station highly selective and accurate, as for instance, in its particle size groupings so that as few fines as possible will pass with the sands back to the grinding mill. In other words, it is important to keep out of the grinding mill as far as possible any solids that are already fine enough and do not need re-grinding. The fewer the fines in the returned sands, the greater will be the grinding efficiency of the mill. Therefore, a general object of this invention is to devise fractionating or classifying mechanisms for suspended solids that will make clean separations and have such sharp selectivity that there will be a minimum of fines in the sands that pass from the machine, meanwhile capable of handling with this capability enormous tonnages of solids. Another object is to endue or invest the machine with durability and ease of operation with a minimum of care and attention. Also to endue the machine with a high degree of adjustability of dividing line or cut of particle size grouping.

Metallurgical classifiers of the present day as constructed for use in closed circuit work are invariably based upon the principles of surface current classification, even though it has long been known that hydraulic classification is more efficient. However, up to now, it has remained an unanswered problem of how to make use of the principles of hydraulic classification in a practical machine that would have the classification capacities for the huge tonnages handled in present-day closed circuit grinding installations.

Hydraulic classification makes use of a column of solids suspended in liquid kept in teeter by an upflowing current of liquid. In a teeter column suspended solids settle in accordance with their inherent settling rates, and they settle in a manner called hindered settling. Such columns have to be taller than is feasible in practice and their classifying capacity per unit volume or area is so small as to comprise another reason for their lack of feasibility in practice.

This invention, then, is based upon the discovery that a teeter column can be used in feasible proportions provided that there be substituted for a major part of the depth of such a column, a shallow bed of mobile settled sands. That is, this invention makes use of a shallow zone or bed of mechanically mobilized settled sands underlying a shallow zone of hydraulically mobilized or teetered suspended solids, with both zones constituting a classifying bath of practical dimensions but having very large classifying capacity.

In order to embody this concept in a practical machine, it then became necessary to devise means for effecting the mechanical mobilizing of the settled sands and at the same time arranging the cooperating mechanical elements and the feed of hydraulic water so that the classifying bath would be continuous in its operation.

The mechanism of this invention embodies the principle of a sand-liquid or pulp teeter column plus a perforated movable constriction plate. Water for the teetering action is flowed upwardly through the perforations in the moving and preferably oscillating plate to form an overflowing bath into which the solids to be classified are fed continuously and wherein they are maintained in mobile suspension. Fine solids are overflowed continuously from the bath by one flow-path while coarser solids or sands are submergedly cascaded continuously from the bath by another flow-path. It is another object of this invention, in making use of such a classifying station, to provide means for controlling and maintaining the density of the bath of mobile solids wherein classification takes place, meanwhile providing a hydraulic control for correlating the upflow velocity of liquid through the perforations in the constriction plate to permit to pass upwardly therethrough just the right amount of liquid in proportion as some solids are desired to be descended through the perforations as a hutch product or third group of selected-out solids. The density of the bath is controlled, in the practice of this invention, by the use of an adjacent body of liquid hydraulically connected with the bath and having a super-elevation as compared with the liquid level of the bath whereby the longer or taller leg of less dense liquid balances a shorter depth of the denser bath. This hydraulic balance is transmitted through the medium of a constantly located pressure-transmitting seal of ever-changing settled, but more or less mobile migrating sands; this seal is an important element or feature of this invention. The control of the uprising velocity of liquid through the perforations of the constriction plate, in the practice of this invention, is by the use of what is commonly called hydraulic water, or pressure liquid having a hydraulic head exerted on it. This hydraulic water control also functions to change the size selectivity of the classifying bath, or the particle size cut or dividing on each side of which the solids are fractionated into groups.

In a phase of this invention, the hydraulic water has a two-fold function. One is to provide the classifying medium while the other is to attain a velocity through the perforations or orifices of the constriction plate such that certain desired solids settleable against the uprising water may or may not be permitted to descend through the perforations. Thus these functions are independent and must be controlled quite separately of each other. It may be that considerable water is required for classification purposes, that is a considerable velocity of upflow of hydraulic water may be desired, but it must be effected without bringing about the excessive dilution of the overflowed fines because of requirements of subsequent treatment of steps such as flotation. Other features of control are effected by the total area of the perforations in the constriction plate; by their distribution; and by their individual diameter.

Since machines embodying this invention may have considerable size, and especially a large diameter of oscillating constriction plate, another object of this invention is to arrange the machine so that a minimum number of or few parts of it oscillate.

This objective has been realized in one embodiment of this invention by locating the classifying bath in an open-bottom fixed marginal boundary member providing a bath-encircling wall that has in proximity to its bottom edge but slightly spaced below the same a perforated constriction plate of an oscillatable assembly constituting a pressure chamber construction that comprises the perforated constriction plate as a top member and a lower member providing a pressure pan or hollowed liquid-holding element extending downwardly with respect to the perforated plate thereby defining a pressure chamber for hydraulic water immediately below and at the underside of the perforated constriction plate, and having a pipe or conduit by which hydraulic water is delivered under pressure into the pressure chamber. The hydraulic water thus supplied exerts sufficient pressure within the chamber to cause the water to flow upwardly therefrom through the several orifices or perforations of the constriction plate and thence as suitably disposed jets or streams into the classifying bath to form a teeter column or zone in the upper portion of the bath wherein hindered settling takes place. As the assembly oscillates in the plane of the extent of the plate or in horizontal paths with respect to a vertically-extending axis, the settled sands in the lower portion of the bath are mechanically mobilized. As a result of this hydraulic mobilization in the upper portion and the mechanical mobilization in the lower portion the solids in each and all sections of the classifier bath are in a mobile state with the result that as the apparatus functions the faster settling solids or sands occupy a lower stratified area or zone while the liquid of the bath containing the slower settling solids or fines occupies an overlying region or upper stratification layer.

In the construction shown, the oscillatable assembly has associated with it an upstanding barrier or circular flange. This barrier is provided by a peripheral portion of the pressure pan or hollow liquid-holding member. This barrier is outwardly disposed with respect to the lower portion of the bath-encircling wall and defines a low sands weir past which settled sands ultimately cascade. The sands incident to their outward transfer from the lower portion of the classifying bath, pass through the space between the lower portion of the bath-encircling wall and the underlying top surface of the perforated constriction plate, and continue outwardly through the space between the outer lower portion of the bath-encircling wall and said barrier until they ultimately flow over and cascade from the barrier. The space left above and about the oscillatable assembly is available whereby the settled sands can flow and travel from the classifying zone to a sands-collecting or receiving zone that extends outside of and below the oscillatable assembly and may be viewed as a sands-transfer space or passageway. This transfer space is normally filled with settled sands in relatively mobile suspension whereby there is provided therein and thereat a continuously maintained seal of mobile sands in which the sands thereof are continually and progressively changing or transiting.

In the normal operation of the apparatus, there is an outflow of liquid with the finer sized solids therein to the exterior of the apparatus, as fines effluent over and past a fines weir provided at or by the upper edge portion of the bath-encircling wall and which may be referred to as a weir of medium or intermediate elevation because it is at an elevation higher than that of the sands weir referred to and lower than that of a density balancing or high unburdened liquid overflow weir hereinafter referred to. Also during the normal operation of the apparatus, there is an outward movement or passage of settled sands from the lower portion of the classifying bath through the space below the bottom edge of the bath-encircling wall and the perforated plate against a static pressure head of relatively clear water or unburdened liquid which is maintained up to a pre-determined super-elevation in the sands-collecting zone into which the sands are passed from the classifying bath. These sands are transferred from the sands-collecting zone or tank to the exterior of the apparatus by any appropriate means. The sands-receiving or collecting tank has marginal sections or walls rising to elevations substantially higher than that of the fines overflow weir, or higher than the overflow edge provided at and along the top of the bath-encircling wall.

The apparatus also essentially embodies a substantially horizontally extending cover section for completing a water-tight construction between the outer portion of the bath-encircling wall and the tank structure defining the sands-collecting zone whereby the unburdened density balancing liquid, which is maintained up to a relatively constant super-elevation in the sands-collecting zone, must exert a relatively constant static pressure against the sands in transit from the classifying bath through the solids transfer passageway into the sands-collecting zone. The horizontally-extending cover, or water-tight completing construction, is vertically spaced above and from the marginal edge of the oscillatable assembly, to wit, vertically spaced above and laterally from the top of the ledge or fines overflow weir of the oscillatable assembly whereby the solids transfer space is left, or is allowed to continue between it and the oscillatable assembly.

The sand-collecting tank is provided with a high outflow section that is provided with an adjustable high overflow weir, for example, in a side wall section of the sand-collecting tank. During the normal operation of the apparatus there is an outflow of supernatant unburdened balancing liquid over and by the adjustable high overflow weir that determines the normal surface level or super-elevation of the unburdened liquid within the sands-collecting tank. The liquid in this connecting tank is referred to as unburdened liquid because of the previous elimination from liquid passed thereto of much of the finer solids which left the apparatus as overflow fines past the fines weir. This liquid is also substantially free of sands received into the sands-collecting tank for they will have gravitated quickly into the lower section of said tank. As previously indicated, this positionable high weir is at elevation higher than that of the fines overflow weir and it determines the normal level of the unburdened balancing liquid in the sands-collecting tank which liquid thus has a super-elevation as compared with that of the general surface level of the liquid in the classifying bath. This super-elevation liquid exerts a constant static pressure or balance, according to the elevation of the adjustable weir, against the solids which are in the bath as well as those which are being transferred from the classifier bath through the transfer space and past the sands weir preparatory to cascading into the sands-collecting tank. The solids which are in this transfer passageway constitute a continuously maintained seal of mobile sands which maintains the classifying bath in proper condition when there is an equilibrium of pressure condition on opposite sides of the seal but which permits an automatic and progressive passage from the bath of the sands classifier and settled therein, whereby the outflow of sands from the classifying bath and the cascading of sands from the marginal edge of the perforated plate can take place while the sands remain in submergence and descend into what may be termed the sands-collecting section in the lower portion of the tank.

The feature of normally progressively passing the classified sands from the classifying bath of a higher hydraulic pressure into a sands-collecting section of a normally slightly lower but controlled hydraulic pressure provided by the super-elevation of the unburdened liquid is an important feature of the embodiment illustrated.

After the classified and settled sands are passed from the higher pressure classifying bath to the lower pressure sands-collecting section, they are emerged or conveyed from submergence in the sands-collecting tank from which they may be returned to the grinding mill or for further treatment.

Therefore, another feature of the apparatus for realizing this invention is the provision of means for accomplishing this emergence of the sands in a way that does not substantially change the water level of the liquid body from which they are emerged for it is the liquid body that is used to provide the necessary super-elevation. The sands must be emerged in a manner to leave unmolested or unfluctuated the super-elevation of the unburdened liquid body from which they are emerged so that the constant density of the classifying bath is not inadvertently changed.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings constituting a part of this specification.

In said drawings:

Fig. 1 diagrammatically illustrates a classifying apparatus based upon the principle of using a classifying bath having a teeter classification zone hydraulically mobilized above a mechanically mobilized bed of settled sands. The apparatus is shown as embodying a stationary tank construction providing a feed-receiving solids-classifying zone past the top of which supernatant liquid with fine solids suspended therein overflows as fines effluent, and a sands-collecting zone that is functionally separated from the classifying zone by a movable assemblage exemplified by a horizontally-movable perforated constriction plate capping a hollow pressure member. The movable or oscillatable assembly is disposed relative to the tank construction whereby there is provided a settled sands transfer passageway leading from the classifying to the sands-collecting zone that is normally sealed by a continually maintained ever-changing body of mobile sand so maintained because of hydraulic water upwardly delivered through the constriction plate into the classifying zone. From the transfer passageway sand is delivered and cascaded into the collecting zone against the static pressure of a body of unburdened balancing liquid therein which has been substantially freed of the fine solids as well as of the settled solids or sands content formerly therein. The body of balancing liquid has a surface of substantial super-elevation as compared with that of the level of the bath in the classifying zone. The sands or heavy solids which readily settle in the sands-collecting zone are conveyed therefrom by any suitable means indicated in the figure by bladed transferring means.

Fig. 1 is a vertical longitudinal sectional view through the vertical axial center X—X of the oscillatable assembly.

Fig. 2 diagrammatically illustrates the oscillatable assembly that provides for the constriction plate a horizontal reciprocative movement and upwardly through the orifices of which during the reciprocative movement thereof water is forcibly delivered from the hollow pressure chamber which is capped or topped by the constriction plate.

Fig. 3 is a view at somewhat larger scale than that shown in Fig. 1 and is illustrative of the details and arrangement thereof in the immediate region of the sands transfer passageway leading from the lower portion of the classification zone into the sands-collecting zone and of the seal of ever-changing mobile sands which is maintained during the normal functioning of the apparatus.

Fig. 6 is a vertical view, partially in section, illustrative of a commercial form of apparatus for realizing the invention.

Figs. 7 and 8 are details illustrative of an adjustable weir construction provided by removable and replaceable overflow rings which according to the elevation of the upper edges of the top rings function to determine the super-elevation or surface level of the balancing body of unburdened liquid within the sands-collecting zone of the tank.

Fig. 9 is a plan view of the apparatus of Fig. 6 and is shown partially broken away and with some of the parts thereof in horizontal section.

Fig. 10 is a vertical sectional view of a crank and connecting rod construction for actuating the oscillatable assembly; this view is a section taken as on the vertical plane indicated by the line 10—10 of Fig. 9 looking in the direction of the arrows.

Fig. 11 is a vertical view partially in section of the classifying section and of the deep end of the sands-collecting section. The parts in this figure are shown at somewhat larger scale than are the corresponding parts of Figs. 6 and 9.

Fig. 12 is a vertical sectional view illustrative of a modified form of batch discharge for the oscillatable assembly.

Figure 5:
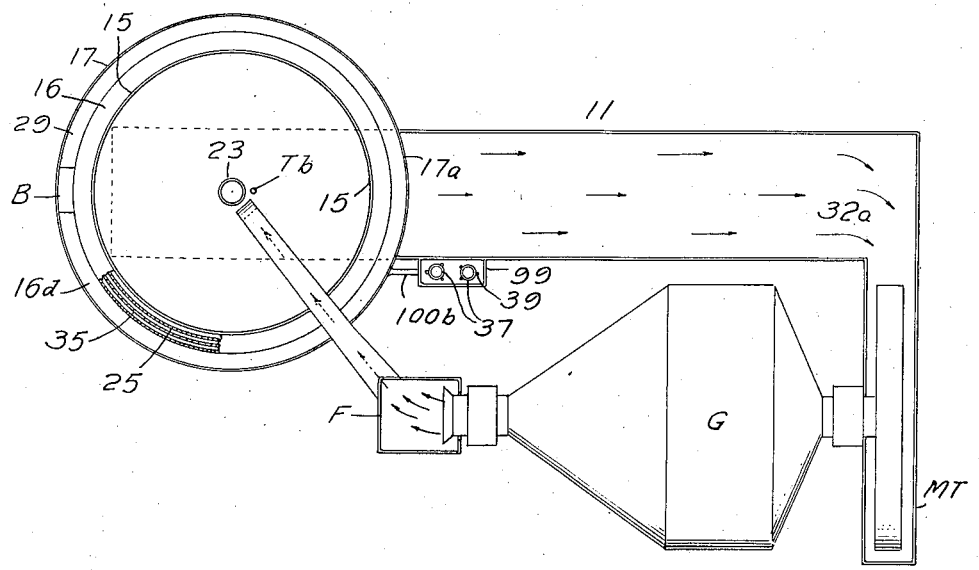
Figs. 4 and 5 are respectively elevation and plan views diagrammatically illustrating how a classifying apparatus embodying the invention hereof is employable in closed circuit with a grinding apparatus typified, for example, by a ball mill.

Fig. 13 is a vertical sectional view taken as on the vertical longitudinally-extending plane that includes the axial center X—X of the oscillatable assembly. This Fig. 13 clearly illustrates the manner in which incoming feed is controllably delivered to and distributed within the classification zone and also the manner in which hydraulic water is supplied to the pressure chamber for upward delivery through the perforations or orifices of the constriction plate.

Fig. 14 is a vertical section—partially broken away—taken as on the vertical longitudinally-extending plane that includes the axial center X—X of the oscillatable assembly. In this figure certain of the parts have been broken away and other parts have been brought closer together in order to clearly bring out the relationship between the feed distributing means, the hydraulic water supply and delivery through the constriction plate, the sands transfer passageway and a low settled-sands discharge weir provided thereat, and the slimes or fines overflow weir at the top edge of the classifying zone.

Figs. 13 and 14 particularly in conjunction with Figs. 11 clearly bring out the features or parts referred to. They also clearly illustrate the construction whereby hutch products can be received in and can be passed from the lowermost portion of the oscillatable assembly and how there can be a controlled release of liquid or of liquid and solids from the lower portion of this oscillatable assembly. In Figs. 13 and 14 the parts are on a larger scale than are the corresponding parts in Figs. 6, 9, or even in Fig. 11.

Herein like reference characters are employed to designate like or analogous functioning parts in both the diagrammatic and the commercial forms.

Figure 4:
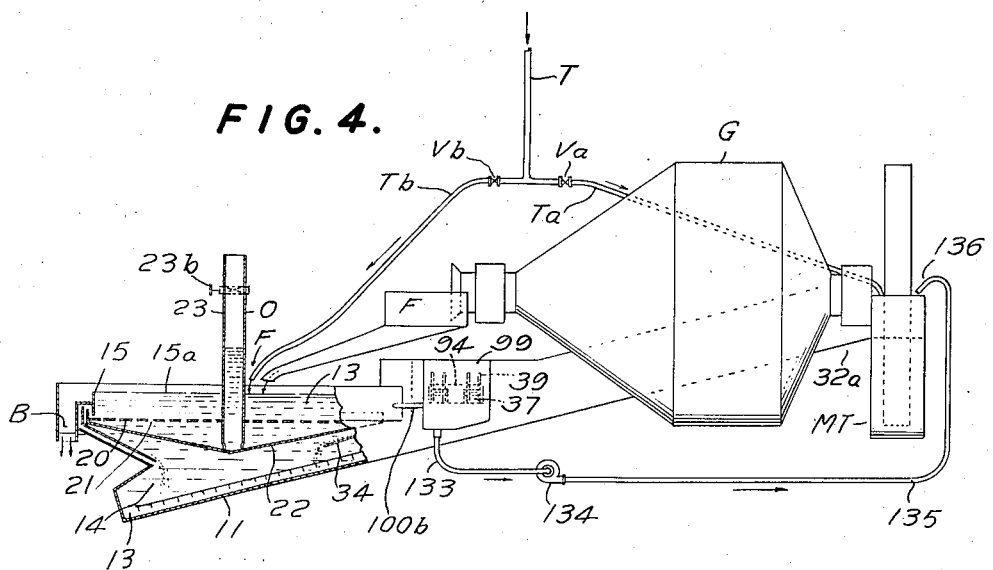

Reference will now be made to the drawings in detail:

First in connection with the diagrammatic showing of essential elements illustrated by Figs. 1 to 3 inclusive, thereafter in connection with the commercial form illustrated by Figs. 6 to 14 inclusive, and finally to the system or arrangement diagrammatically illustrating a mode of employing the classifying apparatus hereof, to wit, as typified by Figs. 4 and 5.

The numeral 11 indicates the tank for holding a body of liquid generally designated 12 that is functionally divided into and which in effect structurally provides a classifying zone or section 13 normally containing a classifying bath 13ª, and a solids or sands-collecting zone or section 14 disposed in a relatively deep end section of the tank 11 for receiving classified coarser solids or sands normally progressively transferred thereto from the classifying zone.

This deep end section of the tank 11 is provided with a vertical open-top and open bottom ring section 15 that serves as a boundary wall encircling the classifier bath 13ª, and a cover section or water-tight completing construction 16 extending between the exterior of the ring section 15 and an adjacent surrounding marginal wall portion 17 of the tank. This wall portion includes a certain part of the tank construction and embodies a rising tank wall section 17ª that is necessary as a partitioning element whereby liquid which has been substantially unburdened of solids can rise or extend upwardly within the sands-collecting zone to a general surface level or super-elevation 18 that is substantially higher than that of said cover section 16 and that is in fact substantially higher than that of the normal level of the surface 19 of the classifier bath. The normal level of the classifier bath is determined by the overflow edge or weir portion 15ª at the top of the boundary or bath encircling wall. This difference in elevation as between this surface of the classifying bath of substantial density on the one hand and the super-elevation of the unburdened liquid of much less density on the other hand immediately indicates the essential existence of certain structural features and operative conditions that must be employed and reckoned with, if the proper differential surface elevation is to be availed of. Having this point in mind, attention is called to the existence of an oscillatable or reciprocable assemblage O having certain operative parts essentially underlying but vertically-spaced a short distance below the lower edge 15ᵇ of the bath-encircling wall 15. The lower edge 15ᵇ of this wall is horizontal. Said oscillatable assemblage has back and forth horizontal motion with respect to a central vertically-extending axis X—X and may be viewed as providing means that in effect functionally separates the classifying zone and the sands-collecting zone.

The oscillatable assemblage comprises a horizontally-extending perforated constriction plate 20 having flow orifices 21 substantially disposed throughout the supporting area thereof; this plate immediately underlies the classifying bath 13ᵃ; a pressure pan or hollow liquid-holding receptacle 22 that is capped or topped by the constriction plate 20; and a valve controlled pipe or conduit 23 constituting means by which pressure liquid or hydraulic water is forcibly delivered into the pressure pan from the latter of which the hydraulic water is ultimately delivered through the orifices 21 upwardly into the lower portion of the classifying body. The oscillatable assembly also preferably includes a sands-transfer hopper or open bottom pan 33. The perforated constriction plate 20 has a functionally unperforated or relatively solid peripheral or marginal portion 24 extending radially outwardly beyond the lower edge 15ᵇ of the bath encircling wall or ring 15. An outlying ledge portion has a barrier 25 which extends upwardly from and with respect to the marginal portion 24 of the constriction plate; said barrier 25 is provided as by the upper edge or upper marginal section of the pressure pan 22. The distance which this outlying barrier 25 rises above the top surface of the constriction plate is relatively short. The upper edge portion of the barrier 25 functions as a low sands weir 25ᵃ over which classified settled sands must pass and thence cascade from the oscillatable assembly—or, as otherwise expressed, from the marginal edge of the constriction plate—into the sands-collecting zone. The hydraulic water which is upwardly delivered under pressure through and from the orifices 21 coupled with the simultaneous horizontal reciprocation of the oscillatable assembly—particularly because of the horizontal back and forth movements of the perforated constriction or flow distribution plate thereof—effects stratification of the faster settling solids as sands in the lower portion of the classifying bath and liquid containing suspended slower settling solids or fines in the upper portion of the bath. The sands-transfer hopper 33 has a sloping body section 34 and a rim section 35 rising therefrom to an elevation higher than that of the upper edge 25ᵃ of the low sands weir 25. This hopper 34 is open at the bottom. It is spaced from the pressure pan 22. It is rigidly connected to the pressure pan 22 by connecting bars or rods 36. The rim 35 is of larger interior diameter than the outside diameter of the low sands ring or weir 25ᵃ. In this way a passageway for overflowing sands is provided leading from the exterior of the low sands ring or weir 25ᵃ to the sands-collecting zone 14.

During the normal operation of the apparatus and particularly such operations as are incident to the feed as along the line F to the bath of the material to be classified there is a release of fines from the upper portion of the classifying bath, to wit, as liquid overflowing weir edge 15ᵃ and which carries with it the finer solids in suspension, and there is a progressive transfer of the sands through the shallow transfer space or outwardly directed passageway 26 leading from between the lower edge 15ᵇ of the bath-encircling ring and the marginal upper surface of the horizontally reciprocating constriction plate to and past the low solids overflow weir 25ᵃ, whereby the sands are thus delivered into the sands-collecting zone; which sands transfer and delivery into the sands-collecting zone is carried out against the static pressure of the unburdened super-elevation liquid in the sands-collecting zone. Incident to said feed and during this normal operating condition there is also a release of unburdened liquid from the sands-collecting zone, to wit, as overflow past a relatively high weir 27 that determines the normal surface level or super-elevation of the unburdened liquid within the sands-collecting zone. In the construction shown the high weir 27 is provided by sets of overflow rings 37 of which the top edges of the uppermost rings 38 thereof collectively provide the high overflow weir 27. The upper and lower face of each ring is finished so that there will result relatively tight joints between them. The rings are removable and replaceable at will whereby the weir 27 is adjustable as to height. They are guided to place and are assisted in being held in proper position by fixed upright rods 39. This weir 27 has been made adjustable as to height whereby the normal surface level or relative super-elevation thereof as compared with the surface elevation of the classifying bath can thereby be adjusted or determined within reasonable limits for any particular operative condition required or desired.

The weir edge 15ᵃ over which liquid with the finer solids suspended therein flows on its way from the classifier is at an elevation substantially higher than that of the low solids overflow weir 25ᵃ but at elevation substantially lower than that of the relatively high weir 27 over which the unburdened liquid of super-elevation passes from the classifier.

It is therefore convenient and quite in order to refer to the weir 25ᵃ as the low sands overflow weir, to the weir edge 15ᵃ as the slimes or fines overflow weir of intermediate elevation, and to the weir 27 as the high unburdened liquid overflow weir.

The low edge portion 15ᵇ of the bath-encircling ring, the underlying constriction plate and particularly the marginal peripheral portion thereof, and the low sands overflow weir 25ᵃ in conjunction with the static back pressure of the unburdened liquid in the sands-collecting zone create and insure the existence of an ever-changing or progressively changing seal of mobile sands 28 extending from the classifying zone substantially throughout the sands-transfer passageway 26. The sand seal is realized by sands in a relatively mobile state so that during a normal operative condition, as when solids are being supplied to the classifying zone for classification therein, there is sufficient density to cause a flowing transfer of some of the classified solids outwardly into the sand seal and sands-transfer passageway, and a consequent release or overflow discharge of some sealing sands into the sands-collecting zone. During such transfer or outward sand movement the sand seal is maintained, and of such a character that incident to a cessation of feed and a consequent substantial decrease in weight or density in the classifying bath a condition is reached such that the static or pressure head of the liquid-solids mixture of the classifying bath can no longer cause the classified solids or sands fraction in the lower portion of the bath to be outwardly displaced and flow into the transfer passageway and thus subsequentially displace other sands of the sand seal against the static or back pressure head of the unburdened liquid having the super-elevation or elevated surface level that is normally determined by the vertically adjustable high overflow weir 27.

The cover construction or section 16 embodies as a part thereof a depressed gradually deepening outflow launder 29 that receives the slimes—or supernatant liquid with fines suspended therein—overflowing thereinto from past the overflow weir 15ᵃ of intermediate elevation. From the overflow launder 29 the fines or slimes received thereby are delivered exteriorly of the apparatus. The gradual depression of the outflow launder section is provided by or because of a pair of right and left approximately spiral-shaped gradually sloping floor sections 16ᵈ, to wit, floor sections or trough bottoms which gradually slope from a centrally disposed crest C in the launder both right and left to the low discharge section B.

The large solids or sands received within the sands-collecting zone readily, in fact quickly, settle within the unburdened liquid in the latter zone. The settled sands are removed from the bottom or low portion of the tank by any suitable means which functions in a manner to always leave unburdened liquid in the sands-collecting zone up to the desired or adjusted super-elevation as determined by the positionable high overflow weir 27. A means for removing the sands as indicated by Figs. 1 and 2 is the bladed sands-conveying rake 31 of the Dorr reciprocable rake classifier type that operates over and along the sloping deck or rising floor 32 of the sands-collecting section 14 of the tank. The raking means functions to transfer the settled sands upwardly along the deck from submergence to emergence and delivers the thus conveyed sands from the upper non-submerged end section 32ᵃ of the deck that extends to an elevation somewhat higher than that of the normal operative overflow position of the overflow weir 27.

The operation carried out in the unit diagrammatically illustrated is as follows:

Material to be classified which may be metallurgical pulp or other mixture embodying sands and fine solids is fed along path (F) to the classifying bath 13ᵃ, to wit, into the upper central portion of the classifying zone 13. Classified fines are overflowed as slimes from the classifying bath past the overflow weir of intermediate height and which is determined or provided by the upper edge 15ᵃ of the bath-encircling ring 15. The overflowed fines or slimes are conducted to the exterior of the apparatus by means of the gradually deepening overflow launder 29. The classified sands or coarser solids are progressively flowed from the classifying bath 13ᵃ through the transfer passageway 26 that extends outwardly below the lower edge 15ᵇ of the classifying ring and these outwardly directed sands ultimately and progressively pass from the maintained sand seal over the constantly submerged low overflow weir 25 from which they cascade or drop while in submergence into the sands-transfer hopper or open bottom pan 33 by which they are transferred as the latter horizontally oscillates into the lowermost sections of the solids-collecting zone 14 from whence they are conveyed by suitable means such as reciprocating rakes or other bladed transfer mechanism 31 to emergence for ultimate delivery from the non-submerged section 32ᵃ at the upper end of the inclined deck 32.

In the starting of the apparatus the tank 11 is filled with water approximately up to the level of the fines overflow weir 15ᵃ of intermediate elevation. The oscillatable assembly is actuated so as to have horizontal angular reciprocative back and forth movement with respect to vertically-extending axis X—X as an axial center. The hydraulic water is supplied to the pipe or conduit 23, controlled as by the valve 23ᵇ and feed is supplied to the upper central portion of the classifying zone as along the line F. The quantity of hydraulic water that is continuously supplied is gradually adjusted and the continuous supply of feed is preferably regulated or delivered under relatively constant conditions. Ultimately a sufficiently high density is reached within the classifying zone whereby the level of the liquid—namely, the unburdened liquid—rises in the solids-collecting zone and reaches the super-elevation or normal surface level 18 therefor, which normal surface level is high as compared with the elevation of the normal surface level 19 of the classifying bath 13ᵃ as operatively determined by the fines overflow weir 15ᵃ. When this condition has been realized the apparatus may be viewed as in condition for normal operation and there is maintained the general relationship of the normal elevation of the bath as determined by the slimes overflow weir 15ᵃ on the one hand and the normal super-elevation of the unburdened liquid in the sands-collecting zone as determined by the adjustable or vertically positionable high overflow weir 27, namely, by the high overflow provided by the removable and replaceable rings 37 of Figs. 7, 8 and 9.

The continued operative condition of the apparatus is predicated upon a constantly maintained seal 28 of mobile sands disposed in the solids transfer passageway 26. The mobile sands in the seal progressively change and are replaced by other sands passing into the seal as the operative steps are carried out in the apparatus. The sands seal progressively changes according to the existence of a sufficient weight or sufficiently high density in the classifying bath 13ᵃ and there is a corresponding consequential outward transfer of sands into and from the passageway against the static head or back pressure of the unburdened liquid of super-elevation in the sands-collecting zone.

As has been previously indicated the upflow of hydraulic water from the oscillating assembly and the horizontal back and forth oscillating reciprocating movement of the flow constriction plate at the bottom of or below the classifying bath effect, insure and maintain the mobile and relatively free flow conditions of the sands or solids in the classifying bath.

The function of the hydraulic water flowing upwardly through the perforations 21 of the flow constriction plate has several aspects. It provides sufficient flow velocity and in cooperation with the repetitive back and forth horizontal movements of the plate functions in keeping the solids in the classifying bath in mobile suspension wherein the heavier solids or sands can settled and stratify. It functions to free and remove from the heavier or coarser solids the lighter or smaller solids as fines and to flow the fines upwardly whereby, as fine solids in liquid suspension, they pass from the classifying zone and overflow the slimes weir of intermediate elevation on their way from the apparatus. The velocity of upflow in the classifier bath is sufficient to maintain the solids in the classifier bath 13ᵃ in a state of teeter. The maintaining of the fines in the state of suspension and of the sands in a relatively mobile state create a situation favorable to a ready changing or shifting of the relative position of the solids in the classifying bath with the further result that the fines are readily released and washed upwards from the heavier solids or sands whereby a sharper cut of solids fractionation or line of demarcation between the settled mobile sands and the overlying supernatant liquid with fines suspended therein can be realized than has heretofore been experienced in commercial operation. With the given character of feed and for a particular line of fractionating the pressure head or weight of the classifying bath 13ª is fixed by adjusting the height of super-elevation of the unburdened back pressure liquid.

Control of the density of the classifying bath is a very important factor in the successful operation of a hydraulic hindered settling classifier and it is an important feature of this invention. Other conditions remaining constant and with a given upward hydraulic water velocity the point of separation of the fines and coarse fractions is a direct function of the density of the classifying pool or teeter pulp column.

An increased elevation of the unburdened liquid overflow causes an increased back pressure against the sand seal and consequently an increased density for the classifying bath, namely, an increased density sufficient to overcome the increased back pressure, and result in solids of greater coarseness being forced over the fine solids overflow. Reversely a lowered elevation of the unburdened liquid overflow weir causes a lessened back pressure against the sand seal and consequently a lessened density for the classifying bath and results in less of the coarser solids being forced over the fine solids overflow. It has been found that very excellent control over the separation can be effected in this way.

The following has particular reference to the commercial form of apparatus as illustrated by Figs. 5 to 11 inclusive.

The commercial apparatus embodies and employs the essential features heretofore described in connection with the diagrammatic showing of Figs. 1 to 3.

Tersely stated the commercial form of apparatus embodies:

No. 1. A stationary main frame or structure by which a liquid-holding tank of the apparatus and certain other functioning parts are supported; the tank may be entirely independent of the stationary frame but it is feasible to construct the frame so as to embody the tank as a part thereof;

No. 2. The liquid-holding tank just referred to which is functionally divided into—

(A) A classifying zone—wherein metallurgical pulp having solids of varying sizes is classified—
    (x) Into larger solids or sands that pass from the lower portion thereof, and
    (y) Into fines in suspension or slimes containing finer solids which overflow from the upper portion thereof, and (B) A sands-receiving and collecting zone into which the sands are passed from the classifying zone against a constant static head of unburdened liquid having a super surface elevation as compared with the elevation of the slimes overflow weir and whereby they are finally submergedly delivered or cascaded into the liquid in the sands-receiving zone;

No. 3. A sands seal made up of progressively changing mobile sands and located in a transfer passageway affording—except for the sealing effect of said sand therein—a constant hydraulic communication between said zones;

No. 4. An oscillatable assembly defining the lowermost limits of said classifying zone and essentially comprising a perforated constriction plate and underlying hollow pressure chamber for receiving hydraulic water under pressure, which water-receiving space provides also a hutch products receiving chamber;

No. 5. Means comprising a platform supporting a stationary bearing for in turn supporting said assemblage whereby it can be oscillated back and forth in horizontal paths relative to a central vertically-extending axis;

No. 6. Conduit means for supplying water under pressure to the oscillating pressure construction just referred to;

No. 7. Feeding means provided by suitably supported members and arranged for delivering the metallurgical pulp to the upper central portion of the classifying bath;

No. 8. Adjustable gates positionable for controlling distribution of pulp from the feeding means into the classifying zone;

No. 9. An adjustable or positionable overflow weir for determining the overflow elevation of unburdened liquid from the sands-collecting section of the tank;

No. 10. Means for transferring from a deep section of the sand-collecting zone to emergence and thence to the exterior of the tank of sands which have settled therein;

No. 11. A hutch delivery pipe or passageway leading from the lower portion of the pressure pan of the oscillatable assembly, to wit, in the form of a pipe leading to the exterior of the tank where valuable products are to be directly recovered from the pressure pan, or in the form of a passageway or conduit delivering directly into the underlying section of the sands-collecting zone or section 14.

No. 12. A plug of hutch valve and members for positioning the same whereby there can be accomplished a discharge of hutch products from the hydraulic pressure chamber;

No. 13. Motor actuated mechanism for imparting back and forth horizontal or angular movement to the oscillator assembly;

No. 14. A sands-transfer hopper or open bottom pan connected to the pressure pan so as to move as part of the oscillatable assembly and positioned for receiving sands passing the low sands overflow weir. This hopper or pan functions to transfer sands into an underlying section of the sands-receiving zone and due to the repetitive oscillating movements thereof there is avoided any tendency or likelihood of sand banking and plugging the transfer space between the underside of the pressure pan and the underlying structure; and No. 15. Where the apparatus is employed in classifying operations according to which particles of heavy valuable metals such as gold, molybdenum, tungsten, chromium, etc. settle into the hutch compartment from which they are independently withdrawn or passed through the medium of a pipe or conduit leading from the lower portion of the hutch compartment to the exterior of the apparatus there is employed a lockable valve. Such valve can only be opened by a key in the hands of an authorized custodian therefor whereby the valuable metals are withdrawn or passed from the hutch under strict surveillance of authorized parties. In this manner snitching or pilfering by an operator or apparatus attendant is prevented or baffled. Such control or protection against thieving or peculation of valuable metal or metals during the classifying recovery thereof from mixed solids containing the same is not embodied in any commercial classifying apparatus up to the present time.

The parts just mentioned and also some other more refined features of the apparatus will be described more minutely in subsequent portion of this specification.

The apparatus as a whole is suitably supported on or by a stationary structure or framework the details of which need not be described, it being sufficient to point out that this framework embodies suitable carrying and bracing elements, as for example, supporting legs provided by upright members such as 40 and 41 and suitable bracing elements typified as by diagonals 42. The framework also embodies certain other supporting members, for example, such as stationary horizontally-extending and horizontally-spaced I-beams 43 that constitute main beams of a stationary elevated platform P affording support for the oscillatable assembly O, for the motivated mechanism employed for actuating the oscillatable assembly, for piping by which the hydraulic water is conducted to the oscillatable assembly and for other parts of the apparatus such as certain parts of the feed means by which the incoming feed is delivered into the classifying bath.

The tank 11 of the apparatus and the oscillatable assembly O are constructed and so cooperatively arranged as to provide within or by the tank structure proper the classifying zone 13ª which is functionally separated from the sands-collecting zone 14. While said zones are functionally separated, nevertheless, the construction of these associated parts is such that said zones are normally in constant hydraulic communication with each other through a constantly submerged sands-transfer passageway 26 leading from the classifying zone into the sands-collecting zone and within which passageway there is created and constantly maintained a seal of relatively mobile sands in which said sands are progressively and constantly changing incident to the normal operation of the apparatus, or in other words, incident to the passing of outwardly moving sands into the seal and of outwardly cascading submerged sands from the seal into the sands-collecting chamber.

At this point it is timely to note that while F designates the line of feed of the material to the central upper portion of the classifying bath 13ª, it also may be viewed as designating that assembly of structural parts by which the incoming feed is inwardly conducted, distributed and ultimately delivered into the upper central portion of the classifying bath 13ª.

The bath 13ª is encircled by and is marginally defined by the open-bottom and open-top encircling wall 15 having a slimes overflow weir provided by and along the upper edge 15ª thereof and disposed so that the lower horizontally-extending edge 15ᵇ thereof is vertically spaced a slight distance above the top of the perforated constriction plate 20 of the oscillatable assembly O.

As to the bath-encircling ring 15 this is preferably constructed so as to embody a body portion 15ᶜ and an upper weir-providing member 15ᵈ. The body portion 15ᶜ is built into the tank structure so as to constitute a stationary ring member. The upper weir-providing member 15ᵈ may be positionably secured and relative to the body portion 15ᶜ whereby the weir or overflow edge thereof can be adjustably positioned according to a desired situation therefor as for the purpose of obtaining a relatively even or level overflow weir construction for the overflow of the slimes into an outflow launder 29.

The tank 11 has embodied therein the cover plate construction or water-tight partitioning element 16. In Fig. 14 this partitioning element is shown in section. It is formed by a horizontally disposed annular member 16ª which is connected so as to provide a water-tight joint between the inner marginal edge thereof and the body portion 15ᶜ of the bath-encircling ring 15 and so as to support the bath-encircling ring therefrom. The outer edge of this horizontally-extending annular plate 16ª is in turn supported upon a cylindrical section 16ᵇ through the medium of a ring 16ᶜ which is of angle shape in cross-section. The cylindrical section 16ᵇ is in turn supported through the medium of right-hand and left-hand launder bottoms as 16ᵈ progressively sloping downwardly in opposite direction from a high point or crest at C and finally curving inwardly while still continuing to slope downwardly until they terminate to provide or leave between the approaching ends thereof a lower discharge opening B. The launder bottom extends to and completes a water-tight joint with surrounding stationary wall portion 17 of the tank 11 whereby a water-tight construction is provided and is thus completed between the bath-encircling ring 15 on the one hand and the surrounding wall portions 17 of the tank structure on the other hand. This surrounding wall portion 17 includes as a part thereof the upstanding section 17ª. (See Figs. 11 or 14.) This water-tight completing construction or cover just described functions whereby with respect to the mobile sand seal provided at 28 there can exist ahead of the seal a relatively dense classifying bath 13ª the normal surface level of which is determined by the overflow slimes weir 15ª and there can exist behind the seal a body of unburdened liquid having a super-elevation or normal surface level that is at elevation substantially higher than that of the relatively dense classifying bath. The body of unburdened liquid is maintained up to a super-elevation or general surface level as indicated at 18, the particular elevation of which is determined by height of a positionable high overflow weir 27 provided by and because of the sets of removable and replaceable rings 37.

Reference has been made to the spaced transversely-extending stationary I-beams 43 as providing support from the feed means F or for at least certain parts thereof and also as providing support for the oscillatable assembly. These beams are tied or connected together at the upper portion thereof by a horizontally-extending plate or plate construction 50. Upon this plate 50 or platform P embodying the same there rests an annular stationary bearing member 51 so as to derive support from the I-beams. The stationary bearing member 51 in turn has movably mounted thereupon a horizontally-oscillatable bearing member 52. Suitable anti-friction means as a series of balls are provided at 53 between annular horizontally-extending raceways preferably provided by strips as 49 of bronze or other suitable material respectively provided on said stationary bearing member and on said oscillatable bearing member. Suitable packing or packing means is provided at 54 and 55 for opposing ingress of either water or dust into or the egress of oil or grease from the space between the bearing members. The lower bearing member is hollow so as to provide receiving space for oil or for lubricating material which is maintained therein. The upper bearing member is constructed so as to provide an inwardly-extending flange 56 to which there is secured by means of bolts 57 a depending tubular carrying member 58 which is flanged at the upper end, and of which the lower end has a firm connection to the rest of the oscillating structure O and particularly to that portion embodying the perforated constriction plate 20 and the underlying pressure pan or hollow member 22. The construction by which the tubular carrying member 58 is brought into firm or rigid association with the parts just referred to includes a horizontally-extending plate or flat upper ring 59 which is welded to the tubular carrier 58, an upright cylindrical member 60 having a section 61 intermediate the top and bottom edges thereof secured to the outer edge of the flat ring 59. The lower edge portion of this cylindrical member is secured by welding to the outer edge portion of a flat lower ring 62, the latter of which is vertically spaced from the overlying upper ring 59. The inner edge portion of the flat lower ring 62 is secured as by welding at 63 to an outer portion of the tubular carrier 58. The inner portion of the constriction plate 20 has a rigid and relatively water-tight connection to a projecting outer edge section of the flat lower ring 62. The construction just described is clearly shown in Figs. 13 and 14 hereof. A lower portion 23$^k$ of the tubular carrier 58 continues downwardly below the lower ring 62 and the extreme lower end 64 of the tubular carrier is secured as by welding to a lower interior portion of the hollow pressure pan 22. This downwardly-extending portion 23$^k$ of the tubular carrier has a horizontally-extending partial partition 65 and located somewhat above the floor portion of the pressure pan and immediately above the outer edge 66 of the partial partition there are holes 23$^m$ for permitting an outflow of pressure water into the surrounding pressure chamber of the oscillatable assembly. The lowermost portion of the tubular carrier 58 also has openings 67 leaving unobstructed or relatively free-flow spaces or passageways of a character permitting the downward inward movement of hutch products H, to wit, of heavy solids into the very lowermost central portion of the pressure pan whereby the hutch products at will can be passed from the interior of the pressure pan by merely raising a cone valve 45 so that the hutch products can pass downwardly into a hutch discharge conduit 44 through which they are hydraulically conveyed and ultimately delivered to the exterior of the apparatus.

In the construction shown the horizontally-extending partial partitioning member 65 carries a tubular section 68 which surrounds, but with substantial clearance, a shank section 45$^a$ of the valve 45. This tubular section may be viewed as a sleeve member for guiding the valve 45 relative to its seat 69. This partial partitioning member 65 aids in stiffening the lowermost section 23$^k$ of the tubular carrier 58 and thereby indirectly the pressure pan 22. The lower portion of the pressure pan receives most of the torque load required for oscillating the pressure pan 22 and its capping constriction plate 20.

It will also be pointed out that the oscillating assembly which provides the pressure chamber or receiving space for the hydraulic water within the pressure pan 22 that is capped or topped by the perforated constriction plate 20 is provided with suitable reinforcing and bracing means comprising associated members such as horizontally-extending radial arms, vertical struts, diagonal bracing elements, and transverse ribs all of which are available for imparting rigidity to this part of the oscillatable assembly and also for making available certain structural elements by which different portions of the constriction plate can be secured in place.

The constriction plate 20 has perforations or flow orifices 21 effectively disposed throughout the general area or bath supporting surface of the plate whereby as the plate oscillates the hydraulic water is supplied upwardly through the orifices 21 to the underside of the classifying bath 13$^a$ and is effectively dispersed within and throughout the horizontal extent of the lower portion of the classifying bath.

Mention has been made of the hydraulic water which is supplied to the pressure chamber by the conduit 23. This conduit may be viewed (see Figs. 11 and 13) as being made up of a stationary pipe section 23$^a$, connected to a valve section 23$^b$ that is in turn connected to a horizontal stationary section 23$^c$ which derives support from the platform P through the medium of supporting legs 23$^p$ provided therefor. This section 23$^c$ has a depending or downwardly-extending branch 23$^d$; it also has an upwardly-extending branch 23$^n$ that is suitably capped by cover plate or member 107 and through which there downwardly extends a rod 106 for operating a hutch valve such as the cone-shaped hutch valve 45. The depending branch or section 23$^d$ has connected thereto a depending flexible element or tubular member 23$^f$ the upper end of which is suitably coupled or otherwise secured to the stationary depending section 23$^d$ as through the medium of flanged coupling members 23$^e$, and the lower end of which is coupled or otherwise secured to a rising flange member 23$^g$ that is provided on and by a horizontal plate member 23$^h$ that constitutes a part of the oscillatable assembly. The rising flange member 23$^g$ and the horizontal plate member 23$^h$ constitute a part of the pressure conduit 23 as does also the lower portion 23$^k$ of the tubular carrier 58, the latter of which is provided with water release ports or openings 23$^m$ heretofore referred to. The tubular construction collectively referred to as 23 and which has just been described, is therefore of a character which permits water to be brought in under pressure from a stationary source and to be transmitted through the medium of the flexible tubular section 23$^f$ into an oscillating section whereby it is available either as hydraulic water, or as diluting water, or as both hydraulic water and diluting water through the orifices 21 of the constriction plate 20 into the classifying bath 13$^a$.

A large quantity of coarse sands pass the sands-overflow weir 25$^a$ as the apparatus commercially functions and if these sands lodge upon a stationary surface of insufficient slope, they are liable to collect as a pile or mass and clog the machine. On the other hand, if they drop upon a reciprocating surface even though that surface has a relatively slight slope, this tendency for clogging is avoided and the sands upon a member providing such surface readily work or gravitate downwardly along the same whereby they are quickly discharged from the low section thereof and delivered into the underlying area designed to receive the same. Having this in mind, there has been provided a sands-transfer hopper or open-bottom pan 33 having a funnelshaped or sloping bottom section 34 providing an open central portion and a rim section 35 rising from the marginal portion of the bottom section. This sands-transfer hopper 33 surrounds and extends below the pressure pan 22. The sands-transfer hopper 33 is disposed in spaced relation with respect to the pressure pan 22 and is secured to the latter through the medium of rods or bars 36 whereby the hopper constitutes a part of the oscillatable assembly and whereby it reciprocates back and forth according to the movements imparted to the apertured constriction plate. The interior of the rim section 35 of this hopper has a diameter larger than that of the outside of the member 25 that provides the low sand overflow weir whereby sufficient sands-transfer area is provided between all sections of the pressure pan on the one hand and the underlying but spacedly disposed sands-transfer hopper or open pan on the other hand. The opening of this hopper is disposed so that the sands passing thereto drop therefrom directly into an underlying section of the sands-collecting zone or section 14.

Reverting now to the feed mechanism at F, it will be noted that this comprises an inclined chute or conduit 85 terminating in a hollow annular member 86 essentially open at the bottom and which derives support from the stationary I-beams 43 through the medium of depending hangers, rods, or bolts 87. This annular feed member 86 constitutes the discharge end of the fixed feed inlet or conduit and causes the incoming feed to be delivered into an underlying feed-receiving pocket R that is provided by an exterior portion of the depending tubular carrier 58, the upper flat annular ring 59 and that portion 88 of the cylindrical member 60 which extends upwardly from the flat upper ring 59. It will also be observed that the cylindrical member 60 just referred to has discharge openings 89 through which material received as feed into the pocket R can pass outwardly from the pocket through the discharge openings just referred to. The effective area through these discharge openings is controlled by positionable gates 90. An annular baffle ring 91 is suitably held in place so as to be in the immediate region functionally ahead of but proximate to the valve controlled feed discharge openings 89 just referred to. It is feasible to have this annular baffle ring 91 either fixedly supported as a stationary member carried from the main frame of the machine or to have it oscillate as part of the oscillatable member and when so carried it would be supported, as for example, through the medium of brackets 91ᵃ extending outwardly from the upper portion of the cylindrical member 60 to the upper interior portion of the baffle ring 91. This baffle ring or circular baffle is arranged for preventing a short-circuiting of incoming feed directly to and over the slimes overflow weir at 15ᵃ, to wit, the weir which is sometimes herein referred to as the overflow weir of intermediate height or elevation. In order that the bath may not be substantially disturbed by the cylindrical section 60 and the annular baffle ring 91, it is advisable that these members be provided by a cylindrical construction that is disposed so that the axis of these members coincides with the axis X—X about which the assembly oscillates.

The construction just described insures a relatively uniform and easy delivery of incoming feed into the upper central portion of the classifying bath 13ᵃ and in a manner whereby the general conditions within the classifying bath can remain relatively undisturbed in so far as the classification operations which are being carried out are involved and whereby the general stratification as between the coarse solids or large solids at the bottom and the supernatant liquid with finer solids therein can be maintained.

According to the drawings under immediate consideration there is also illustrated the location and specific construction of the structure providing for the release as overflow of the unburdened liquid over or past the high overflow weir 27. Details of this overflow construction are particularly illustrated in Figs. 7, 8 and 9 hereof. In this connection it is to be noted that a vertical straight side-wall portion of the tank is provided with a large liquid-transfer opening 94 leading from the sands-collecting zone to an outside pocket structure or overflow box having a discharge pipe or conduit leading therefrom to a locality outside of the classifying apparatus.

The pocket structure 99 is divided by a horizontal partition plate 101, having opens 102 therethrough, into an upper section 103 and a lower section 104. The large discharge opening 94 is at an elevation suitable for permitting the flow or release of unburdened liquid from the upper interior portion of the sands-collecting zone on its way from the apparatus. This partition plate 101 is at an elevation as low or lower than that of the lowermost marginal section of the liquid-transfer opening 94 whereby the unburdened liquid passing therethrough is received into the upper section 103 of the pocket. It is also preferably at an elevation slightly higher than that of the crest C of the outflow launder 29 that receives the fines passing the fines overflow weir 15ᵃ of intermediate elevation. The reason for this will presently appear.

An overflow construction is provided in the pocket structure 99 by a plurality of sets of annular rings 37 that are assembled so as to rise from the top horizontal partition plate and so as to register with the openings 102 in the latter. The thus assembled rings have finished surfaces at the upper and lowermost ends thereof whereby any substantial leakage through the joints between them is prevented or avoided. Fixed upright rods or bars 39 rise from the partition plate and serve as members for guiding the rings when being inserted in place and for aiding in holding the rings in place. The upper edge portion of the uppermost ring 38 of each set provides a high overflow weir and the upper edge portions of the upper rings of the several sets can be viewed as collectively functioning to provide the high unburdened-liquid overflow weir 27 heretofore referred to. The rings 37 are readily removable and replaceable. They can be assembled to attain the desired height or elevation for the overflow weir 27 and thereby control the elevation of the unburdened liquid in the sands-collecting zone. The overflow liquid passing the upper edges of the uppermost rings of the set pass downwardly through the downflow passageways provided by the sets of assembled rings thence into the lower section 104 of the pocket structure.

As to the unburdened overflow liquid received in the low section 104, all or part thereof passes from this section through the pipe or connection 100. The major part of the overflow may be passed through the pipe or connection 100 for delivery along one path while the rest may pass from the low section through an overflow or release opening 100a thence through the pipe or connection 100b by which it is delivered along another path into the overflow launder 29.

If desired a substantial quantity of the unburdened liquid can be relatively quickly discharged from the tank—as for the purpose of substantially and quickly lowering the general level of the liquid within the tank—by removing the rings down to the partition 101. In this way the construction that includes the assembled overflow ring provides what may be referred to as a quick outflow or release construction that can be employed independent of any discharge of liquid or of liquid and solids from the lowermost portion of the sands-collecting section 14 as through a quick-acting dump gate 132 which is commonly used at the heel or lowermost portion of any sloping bottom tank equipped with reciprocating Dorr type of rakes.

In the classifier as illustrated a reciprocating bladed rake structure 31 of the Dorr type is employed for progressively transferring the classified larger solids or settled sands from the lower interior portion of the sands-collecting zone 14 upwardly along the inclined deck 32 to emergence on the unsubmerged section 32a of the deck from whence the thus transferred and substantially dewatered sands are ultimately passed from the apparatus. Actuating mechanism A is employed for reciprocating the rake. Such mechanism is well known. As a matter of fact the rake and the actuated mechanism therefor illustrated is substantially the same as that shown and described in the United States patent to Finney No. 1,997,379, granted April 9, 1935, and in view of this fact applicant is not including herein any extended description with respect to the operating mechanism for the bladed sands-transferring means or rake-providing structure 31. It is sufficient to point out that the sands-removing mechanism employed in the apparatus is typical of any one of several forms which might be utilized for conveying the settled classified sands or larger solids from within the lower portion of the sands-collecting zone to emergence and from the apparatus without upsetting the operative classifying conditions within the apparatus.

As to hutch valve or cone-shaped valve 45 previously referred to, this is normally in the closed position shown in Figs. 11, 13 and 14. It may be actuated or moved to open position from the exterior of the machine through the medium of a handle 105 and a valve rod 106 which extends downwardly through and is slidable with respect to a cap 107 that is provided at and which is secured to the top of a flanged upwardly-extending branch 23n of the hydraulic water inlet pipe 23. Suitable packing is provided at 108 in a recessed portion of the cap and a gland 109 is relied upon for compressing the packing sufficient to provide a water-tight sleeve about the valve rod whereby there is prevented the leakage of pressure water from the interior of the supply pipe past the valve rod. The lower end of this valve rod is connected to the upper end of the shank member 45a of the hutch valve 45 through the medium of a pin or bolt connection at 110.

The hutch discharge conduit previously referred to is normally closed by the plug or cone-shaped valve 45. The discharge conduit 44 embodies in sequence an elbow 46 which is the member that is in direct communication with the interior of the oscillating assembly, a flexible tubular member 47 having a water-tight coupling or connection to the elbow 46 and a stationary tubular delivery section 48 with which the flexible tubular member has a water-tight coupling or connection. The stationary delivery section 48 extends through a wall at the deep end of the tank structure and is installed with a water-tight joint between the interior thereof on the one hand and the tank wall on the other hand. The flexible tubular section 47 is provided whereby the oscillatable assembly can have horizontal reciprocative movements imparted thereto and at the same time whereby according to operative requirements hutch products can be passed from the bottom of the oscillatable assembly through the fixed tubular delivery section to a locality outside of the apparatus. The members for operating the cone-shaped valve 45 have been described.

Reference has heretofore been made to the fact that when the classifying apparatus is operated for recovery of valuable metals in the hutch compartment that protection against thievery or peculation of such metals can be baffled or prevented by the employment of a lockable valve applied to the discharge conduit leading from the hutch compartment. Such valve is designated 117 and is shown as attached to the outer end of the section 48 of the hutch discharge conduit 44. The end section 48 is preferably built into the tank structure and welded thereto as a permanent member thereof. This valve 117 may be of any suitable type. It is shown as having the movable valve element 118 thereof normally held in locked position against its seat through the medium of a swinging link 119 that is pivotally mounted on a yoke member 120 which is permanently secured in place. An operating lever 121 is pivotally connected and fulcrumed at 122 to the upper end of the link 119. This lever has connected thereto at 123 the upper end of the stem of the movable valve element 118. The free or swinging end 124 of the lever is provided with an eye which when in valve closing position registers with an eye in a tab 125 which is permanently secured as by welding to the tank construction. A padlock at 126 serves as a means for locking the lever and therethrough the movable valve element in closed position.

It will be manifest from that which has preceded that the several parts entering into this construction should be so made that they allow the valve 117 to be operated when unlocked, but so that the valve 117 cannot be disassembled without practically destroying the same or the structure embodying the same. In other words, the several parts should be made, so that they are not readily removable, as by welding nuts in place on bolts where screw-threaded connections are employed. It will be noted that the arrangement of the machine is such that it is practically impossible for an operator to attain access to the hutch compartment during the operation thereof.

Where it is not desired to pass hutch products directly from the hutch chamber to the exterior of the apparatus or, as otherwise expressed, where there is contemplated the passing of hutch products or solids from the hutch chamber directly into the underlying section of the sands-collecting zone 14, this can be accomplished by using in the oscillatable assembly a hutch valve construction such as is illustrated by Fig. 12. According to this figure a plug type of valve 145 is employed that fits into seating position 169 at the bottom or lower section of the pressure pan 22 and there is omitted the hutch discharge conduit 44 heretofore described. The plug valve of valve 145 is lifted from its seat by and positioned in respect thereto by the rod 106 in the same manner that the cone valve 45 was lifted and positioned. By lifting the plug valve 145 from its seat there is permitted a direct passing of solids from the hutch compartment through the seat 169 directly into the sands-collecting zone.

The actuating means shown embodies the motor M and includes the rotor m of the motor M; a speed reducing and power transmission mechanism collectively referred to as 70 and comprising members such as a small motor-shaft driving pulley 78, belts 79 and a large driving pulley 80 providing a rim for turning a crank disc 111 about the axial center of a main crank shaft S; a crank construction comprising the crank disc 111 previously referred to; the crank shaft S upon and by which this disc 111 is carried; an adjustable crank element 81 which is mounted upon and secured to the crank disc; a link 82 of which one end is driven from the crank pin proper of the adjustable crank element 81 while the other end is pivotally connected at 83 to the outer or free end of an arm construction 76; and the arm construction 76 that comprises the converging members 75 of which the spaced inner ends are connected at 72 to the turnable bearing member 52 of the oscillatable assembly. The intermediate sections of the converging members 75 are braced by a strut 77 extending from one member to the other.

In Fig. 10 there is shown the manner in which a stationary bearing member 71 is provided on the stationary platform structure for the main crank shaft S. For this shaft S certain antifriction bearing members are preferably provided as at 73. The crank element 81 is constructed so as to embody the crank pin proper, designated 112, and a circular flange portion 113 integral with the pin 112. The circular flange portion 113 also includes as a part thereof a circular section 115 in the form of an extension concentric therewith. This extension fits a circular recess 116 in the crank disc. This circular recess 116 is off center, viz., eccentric with respect to the axis of the main crank shaft S. The crank pin proper 112 is not concentric, or, as otherwise expressed, is eccentrically located with respect to the center of the circular flange portion 113 and with respect to the circular extension 115 of the latter. The crank element 81 which includes the crank pin 112 and the flange portion 113 is normally held in place by a series of securing bolts or screws 114 that are located along a pitch circle concentric with the circular extension 115 and they are equally spaced along this pitch circle. By removing the bolts and properly turning the circular flange sections 113 in which the bolt holes of the flange sections register with the bolt or screw-receiving holes in the crank disc, the position of the crank pin 112 either to or from the axis of the shaft S can be changed with the result that the effective length or throw of the crank can be realized. The crank pin 112 when adjusted can thereafter be secured in place by means of the securing screws or bolts 114 referred to.

By the mechanism just described or referred to the desired and in fact the adjusted horizontal back and forth movements or horizontal oscillations are imparted to the horizontal assembly to which reciprocatory movements are requisite for the normal operation of the machine.

The small motor pulley 78, the belts 79 and large driven pulleys 80 provide not only as power transmission mechanism but may be viewed as illustrative of mechanism whereby a relatively slow but relatively positive horizontal reciprocation is imparted to the oscillatable members or assembly from the relatively fast turning rotor m of the stationary motor M.

From that which has preceded it will be clear that the material to be treated which may be in the form of a liquid-solids mixture or metallurgical pulp is supplied through the medium of the feed mechanism F into the upper central portion of the classifying bath 13ᵃ and that hydraulic water is also supplied under pressure through pipe or conduit construction 23 to the interior of the oscillatable assembly that includes the perforated constriction plate 20 which is located immediately below and which in fact defines the lowermost limits of the classifying bath 13ᵃ.

It is also clear that horizontal reciprocating or oscillating of the oscillatable assembly is simultaneously taking place.

It will also be manifest from that which has preceded that in the normal operation of the apparatus the mobile sands seal function at 28 whereby stratification is maintained and insured in the classifying bath, to wit, so as to embody a lower zone of stratified larger classified solids and so as to insure an upper zone of liquid having finer solids suspended therein and whereby at the delivery side of the sands seal a body of unburdened liquid is maintained at a substantially higher surface elevation as compared with the surface elevation of the classifying bath and so as to constantly exert static pressure, or, as otherwise expressed, opposing back pressure functioning in a direction tending to oppose the outward movement of sands from said sands seal but which allows, when sufficiently overcome, outward movement of sands from the progressively-changing sands seal. The outward movement of sands from the sands seal is incident or consequent to the feed of material into the classifying bath and the realization of a sufficiently high density within the classifying bath. It will also be apparent that the superelevation of the unburdened liquid can be regulated according to a particular classification or fractionating desired and that hydraulic water can be supplied either because of the velocity features desired or because of a certain desire for water for diluting purposes.

It will also be apparent that hutch products which may collect in the bottom of the pressure pan can be removed as and when desired by positioning of the hutch valve referred to. In other words, the hutch products can at will be released and passed from the pressure chamber to a locality outside of the apparatus.

It will also be manifest that the sands or larger solids which pass into the collecting zone and readily settle therein can be removed therefrom to the exterior of the apparatus in any suitable manner, as for example, by the employment of the mechanically-actuated bladed raking means described.

In the operating of the apparatus it becomes advisable to have means whereby the static head or pressure within the pressure pan 22 is at all times readily ascertained by the operator and to that end there are provided tube sections 130 that extend through and upwardly from sections of the flat lower ring 62 to and through sections of the flat upper ring 59. A plurality of these tube sections 130 are preferably provided but in general all of these tubes are closed off with the exception of the certain one which is selected for use because of its convenient location and to this one there is connected an upper section or tubular member 131. These sections 130 and 131 provide a pipe leading upwardly from the upper interior portion of the pressure to a locality substantially above the surface level 13 of the classifying bath whereby it is available for employment as part of a manometer construction whereby the static pressure or hydrostatic head of the liquid in the upper portion of the pressure pan can be directly ascertained.

In Figs. 4 and 5 there is indicated a manner in which the classifying apparatus hereof is employable in operative association with a grinding apparatus G of any suitable type, preferably of the commercial type usually known as a ball or tube mill.

According to the system indicated the grinding mill and classifier are shown in what is commonly referred to as a closed circuit arrangement, to wit, in a system (a) in which the material—as metallurgical pulp or other solids mixture to be classified—is continuously supplied to the circuit; (b) in which there is a constant recirculation or repetitive passing of the mixture, particularly of coarse solids therein through the mill and classifier; and (c) in which there is a constant release of fines or finer solids in liquid suspension from the circuit, to wit, as slimes overflow.

The material to be classified is delivered into the circuit along the pathway, conduit, or trough T which is indicated as having a branch Ta with a control valve or gate Va therein, and a branch Tb with another control valve or gate Vb therein. According to the positioning of said valves or gates incoming material is delivered directly to the mill or directly to the classifier, to wit, according to the operative procedure desired for the particular incoming material. In general where the incoming material is in the form of metallurgical pulp or in the form of material to be converted into metallurgical pulp the valve or gate Va will be open and the incoming material will be delivered directly by the branch or conduit section Ta into the mill-supply trough MT from which it can be picked up and passed into the mill by the usual mill feed scoop.

The grinding operation carried out in the mill is usually of the type known as wet grinding and the material supplied thereto for treatment therein is usually supplied as a liquid-solids mixture. From the mill the pulp or mixture of liquid and ground solids move along the pathway, trough or conduit F and is delivered into the classifier as already described.

When the incoming material on its way to the closed circuit is delivered along the branch or trough section Tb then there is a merger of the incoming material and the ground solids from the mill G whereby the incoming material and the ground solids are together delivered and distributed into the classifying bath of the classifier from which there is an overflow of fines in suspension past the slimes overflow weir 15ª or weir of intermediate elevation. Normally at the same time there is a passing of coarse solids as sands progressively into and through the sands seal 28, thence over and past the low sands overflow weir 25ª from which the sands passing the same cascade into the sands-receiving section 14 of the tank 11. From the sands-receiving section 14 the coarse sands are progressively raked, or otherwise impelled from submergence to emergence past the high discharge end section 32ª of the tank. Sands thus delivered from the classifier drop into a receiving branch or arm of the mill trough MT and move as by flowing or sliding downwardly along said arm to a locality whereat they are picked up by the mill scoop and thus delivered into the mill for further grinding.

Where the classifying apparatus is used in closed circuit with a grinding mill, typified by a ball or rod mill G, it is practical and in fact, advisable to return or pass a large part, if not all, of the unburdened liquid overflowing the high weir 27 of the classifier to the feed-receiving end of the mill. To that end there is indicated in the arrangement of Figs. 4 and 5 a means for accomplishing this transfer. The means just referred to includes the pocket structure 99 that is divided by the partition 101 into an upper section 103 within which the overflow weir 27 is provided and a lower section 104 into which the overflow unburdened liquid is initially received; a pump 134; a pipe 133 leading from the low section 104 to the suction side of the pump; and another pipe 135 leading from the discharge section of the pump back towards mill trough MT. The delivery end section 136 of the last mentioned pipe directs the unburdened liquid passing therefrom into the mill trough MT whereby as the mill operates the feed scoop thereof picks up and delivers into the mill not only the sands which had passed from the classifier into the mill trough, but also the unburdened liquid which had been passed by pumping into the trough.

As a matter of fact, the sands which overflow the weir edge 25ª of the low-sands weir carries with them just about that quantity of water which should be mixed therewith when the grinding operation is carried out. The raking mechanism of the classifier functions as a dewaterer thusly the sands as delivered from the classifier into the mill trough lack water sufficient for grinding and should have liquid added thereto in order to provide the proper consistency or pulp conditions for the milling or grinding operation. The mechanism which includes the pump 134 therefor is relied upon to release or transfer to the mill trough MT much, if not all the unburdened liquid outflowing from the sands-collecting zone to the mill. Where all of this unburdened liquid is not passed to or required at the head end of the mill, some of it tends to accumulate in the lower section 104 of the pocket structure 99. This excess accumulation rises therein and is allowed to flow as released liquid through the outflow passageway 100ª, thence into the pipe 100ᵇ by which it is delivered into the outflow launder 29. In this way the excess quantity is caused to mingle with the fines or slimes passing the overflow weir 15ª of intermediate elevation so as to pass with the latter as outflow from the combined classifier and grinding unit.

I claim:

1. Classifying apparatus comprising in operative combination a liquid-holding tank; tank-dividing means providing a sands-transfer passage therethrough and equipped with a low sands overflow weir effective in the retaining of a sands seal as an essential part of said means, which said tank-dividing means separates the interior of the tank into functionally distinct sections of which one serves as a classifying section while the other serves as a sands-collecting section; means providing an overflow weir of high elevation for releasing unburdened liquid from said sands-collecting section when the liquid therein rises above that of the normal level as determined by said high overflow weir; means providing for the classifying section a fines overflow weir of intermediate elevation and associated effluent launder for receiving slimes passing said fines-overflow weir; said tank-dividing means also essentially comprising a horizontally-reciprocable horizontally-extending apertured constriction plate and a member providing a fixed boundary wall disposed above the plate and therewith providing for the classifying section a classifying zone which overlies the plate and which is marginally defined by said wall, means providing a pressure pan cooperatively associated with and disposed at the underside of the plate; means for supplying water under pressure to the interior of said pan whereby water thus supplied functions as hydraulic water that passes upwardly through the apertures of the constriction plate; means for horizontally reciprocating said plate, and means for removing settled sands from the lower interior portion of said sands-collecting means and delivering the removed sands to the exterior of said tank.

2. Apparatus for classifying suspended solids comprising a liquid-holding tank having a classifying section and a classified sands-collecting section; classifying means including an open bottom boundary wall encircling a classifying bath, which wall has a horizontally-extending lower edge; a horizontally reciprocating perforated plate arranged adjacent the lower edge of the fixed boundary wall but vertically spaced therefrom for providing a sands-transfer area wherein there is maintained a progressively-changing body of sealing sands; an outlying barrier disposed about and in spaced relation with respect to the lower portion of said boundary wall and extending upwardly with respect to the marginal portion of said perforated plate for functioning as a low weir over which sands from the progressively-changing body of sealing sands must pass before delivery as classified sands into said sands-collecting section; a pressure pan cooperatively associated with the plate and disposed below the apertured portion thereof whereby said plate provides the roof of a pressure chamber within the pan; means for maintaining a degree of water pressure acting inwardly on the outside of the wall, the body of sealing sands, and the members providing the pressure chamber; means for horizontally reciprocating said plate in a pathway paralleling the horizontally-extending lower edge of the boundary wall and without imparting vertical movement to said plate; means for supplying to the pressure chamber water at a pressure sufficiently great whereby water will flow upwardly through the perforations of the plate into the bath; means for supplying to the classifying bath solids to be classified; means for overflowing slimes containing fines in suspension from the upper portion of the classifying bath; and means for removing classified sands from the sands-collecting section.

3. A unit of the class described comprising a classifier and a grinding mill in closed circuit arrangement, and means for supplying incoming material to the circuit embodying the same; said classifier including a liquid-holding tank, tank-dividing means providing a sands-transfer passage therethrough and equipped with a low sands overflow weir effective in the retaining of a sands seal as an essential part of said means that functionally separates the interior of the tank into a classifying section and a sands-collecting section, means providing an overflow of high elevation for the release of supernatant liquid from the sands-collecting section when it rises above the normal level as determined by the high overflow weir, means providing a pocket for receiving said overflowing supernatant liquid, means providing for the classifying section a fines overflow weir of intermediate elevation and an associated effluent launder for receiving slimes passing said fines overflow weir; said dividing means essentially comprising a horizontally-reciprocating horizontally-extending apertured constriction plate and a boundary wall above the plate thereby providing for the classifying section a classifying zone which is immediately above the plate; said classifier having means for horizontally reciprocating said plate, and also essentially having associated with the plate at the underside thereof a pressure pan equipped with means for supplying water under pressure to the interior thereof and disposed so that water thus supplied to the interior thereof functions as hydraulic water that is passed upwardly through the apertures of the constriction plate; said classifier also having a trough for receiving dewatered sands and means for removing settled sands from the lower interior portion of the sands-collecting section and for delivering the removed sands as relatively dewatered to said trough; the grinding mill having feeding means for transferring sands from said trough into the feed end of the mill; said unit having means for conducting ground products from the mill and delivering the same into said classifying zone, the unit also having means for transferring overflowed supernatant liquid from said pocket along one path to a locality whereat it is fed into the feed-receiving end of the mill, said pocket also having means providing an outflow release passageway leading therefrom along another path to a locality outside of the classifier whereby any of the supernatant liquid overflowing the high weir and tending to accumulate on the pocket can be released.

4. A unit of the class described comprising a classifier and a grinding mill in closed circuit arrangement and means for supplying incoming material to the circuit; said classifier including a liquid-holding tank; means functionally dividing the tank into a classifying section for holding a classifying bath of relatively high density, and a sands-collecting section for receiving sands forwardly passed thereto from the classifying section and for holding supernatant unburdened back-pressure liquid of relatively low density, said dividing means providing a sands-transfer passageway equipped with a low-sands overflow weir for retaining a progressively changing body of sands functioning as a transitory sealing medium for said transfer passageway and which is repleted by the sands passed thereto from the lower portion of the bath in the classifier section as the sands of said transitory sealing medium are progressively moved forwardly past said low overflow weir on their way from the classifying section towards and into the collecting section incident to the normal functioning of the classifier consequent to the feeding of solids-bearing material into said bath; the sands-collecting section of said tank being provided with a high overflow weir for permitting the release as overflow of supernatant liquid from the sands-collecting zone as and when the normal surface level thereof as determined by said overflow weir is exceeded; the classifying section of said tank being provided with a slimes overflow weir of elevation intermediate that of the low-sands overflow weir and that of said high overflow weir and with an outflow launder into which said overflowing slimes that are composed of overflowing fines are received; said tank-dividing means essentially comprising a horizontally-reciprocating horizontally-extending apertured constriction plate and a boundary wall above the plate providing therein the zone above the plate; and wherein the classifying bath is located; said classifier also having means for horizontally reciprocating said constriction plate; and also having at the underside of the constriction plate a pressure pan equipped with means for supplying water to the interior thereof and disposed so that water thus supplied to the interior of the pan is availed of for functioning as hydraulic water that passes upwardly through the apertures of the constriction plate as the latter is reciprocated; said unit also having a dewatered sands-receiving means outside of the classifier, means for removing sands from the lower interior portion of the sands-collecting section and for delivering the removed sands as relatively dewatered sands to said dewatered sands-receiving means; a high pocket structure having a low section thereof disposed for receiving unburdened supernatant liquid passing said high overflow weir, and means for transferring supernatant liquid overflow from the lower portion of said low section of the pocket to and into the dewatered sands-receiving trough, means for transferring dewatered sands and liquid from the dewatered sands-receiving trough into the feed end of the mill, and means for conducting ground products from the mill and delivering the same into the classifying section of the classifier; said pocket also having an outflow passageway leading from the upper interior portion of the low section of said pocket and a conduit leading therefrom to the slimes-receiving launder whereby any supernatant liquid overflow passing said high weir and tending to accumulate in the low section of said pocket can be releasably passed to and into the fines overflow weir.

5. A classifier including in operative combination a liquid-holding tank; means functionally dividing the tank into a classifying section for holding a classifying bath of relatively high density and a sands-collecting section for receiving sands forwardly passed thereto from the classifying section and for holding supernatant unburdened back pressure liquid of relatively low density, said dividing means providing a sands-transfer passageway equipped with a low sands overflow weir for retaining a progressively changing body of sands functioning as a transitory sealing medium for said transfer passageway and which is repleted by the sands passed thereto from the lower portion of the bath in the classifying section as the sands of said transitory sealing medium are progressively moved forward past said low overflow weir on their way from the classifying section towards and into the collecting section incident to the normal functioning of the classifier consequent to the feeding of solids-bearing material into said path; the sands-collecting section of said tank being provided with a high overflow weir for permitting the release as overflow of unburdened supernatant liquid from the sands-collecting zone as and when the normal surface level thereof as determined by said high overflow weir is exceeded; the classifying section of the tank being provided with a slimes overflow weir of elevation intermediate that of the low-sands overflow weir and that of said high overflow weir and with an outflow launder into which said overflowing slimes that are composed of outflowing fines are received; said tank means essentially comprising a horizontally-reciprocating horizontally-extending apertured constriction plate and a boundary wall above the plate for providing therein and above the plate a zone wherein the classifying bath is located; said classifier also having means for horizontally-reciprocating said constriction plate; a pressure pan at the underside of the constriction plate equipped with means for supplying water to the interior of the pan and disposed so that the water thus supplied to the interior of the pan is available for functioning as hydraulic water that passes upwardly through the apertures of the constriction plate into said bed as the plate is reciprocated; and means for removing sands from the lower interior portion of the sands-collecting section and for delivering the removed sands as relatively dewatered sands to the exterior of said classifier.

6. An apparatus of the class described comprising in operative combination a liquid-holding structure embodying an apertured horizontally-extending flow constriction and distributing member, means for imparting reciprocatory horizontal movements thereto without imparting up or down movements thereto, means for supplying water for delivery constantly and relatively uniformly upwardly through the apertured portion of the member into the region immediately above the same, a marginal wall extending upwardly to a point above the apertured member and providing with the latter a classifying space wherein a liquid-solids body is located and normally maintained while undergoing treatment for the fractionating of the solids into different groups of fines and sands and which marginal wall is disposed so as to hold said body against lateral bodily displacement, a fines overflow weir of normal constant elevation that determines the normal level of the liquid body which is laterally confined by the marginal wall, and means leading upwardly from the lower portion of said liquid-solids body and providing a sands overflow weir of normal constant elevation and disposed at an elevation lower than that of the first mentioned weir whereby as the apparatus normally functions sands will be hydraulically passed from the lower portion of the body and ultimately will be delivered over the lower sands overflow weir, said apparatus being characterized in that it includes a liquid-confining structure for holding a body of back pressure liquid that is in constant hydraulic communication with that portion of the classifier holding the liquid-solids body undergoing classification through the medium of the means leading upwardly from the lower portion of the liquid-solids body and providing the sands overflow weir, and in that said liquid-confining structure rises to elevations substantially higher than that of said fines overflow weir and is provided with a release overflow weir at elevation substantially higher than that of said fines overflow weir.

7. An apparatus as defined in and by claim 6 in which the release overflow weir is vertically positionable to elevations substantially higher than that of the fines overflow weir whereby the effective pressure of the back pressure liquid can be selectively adjusted.

8. A classifying apparatus comprising means providing a zone wherein there is held a classifying bath containing solids to be classified, said means embodying a boundary wall within which said bath is located and a horizontal reciprocatory bottom unit that includes a perforated plate defining the bottom limits of said bath; a pressure pan cooperatively associated with said perforated plate and underlying the perforated portion of the plate whereby a pressure chamber is provided between said plate and said pan; a ledge member outwardly and spacedly disposed with respect to the boundary wall and rising a distance above the top surface of the perforated plate for functioning as a low sands weir; a sealing body of progressively-changing outwardly-moving sands maintained on said plate and extending upwardly into engagement with the lower edge portion of the boundary wall whereby there is provided a sealing medium for a sands-transfer area between the plate and the lower edge portion of the wall; feeding means leading to said classifying bath; means for supplying water under pressure to said pressure chamber; means for horizontally reciprocating said bottom unit without imparting vertical movement thereto and so that the horizontal movement of the plate parallels the edge portion of the boundary wall engaged by the sands in said sands-transfer area; means providing a slimes overflow weir substantially at the liquid level of the bath for the release of the supernatant liquid of the bath containing classified suspended solids therein; a tank surrounding said unit and at least the lower portion of said boundary wall and provided for holding a liquid body having hydraulic communication through said sands-sealing means with the bath; said bottom unit being disposed so that the classified coarser solids which pass into and constitute the sealing body of sands cascade as submerged sands into said tank whereat they are freed to settle therein; an outflow means providing an unburdened-liquid overflow weir for releasing liquid freed of settled sands from the liquid within the tank; and means for removing cascaded sands from said tank; the elevation of said unburdened-liquid overflow weir being substantially higher than that of the elevation of the surface of said perforated plate.

9. An apparatus as defined in and by claim 8, in which the unburdened liquid overflow is adjustable to within elevations higher than that of the slimes overflow weir for thereby controlling the relative elevation of the surface level of the unburdened liquid within the tank with respect to the elevation of the surface level of the liquid of the classifying bath.

10. Apparatus according to claim 8, in which the unburdened overflow weir is adjustable as to elevation for thereby controlling and maintaining substantially constant the density of the classifying bath.

11. Apparatus according to claim 8, in which the ledge member rises from and is connected to the marginal edge of the horizontal reciprocatory bottom unit; and in which the pressure pan is connected to the perforated plate whereby it is embodied as part of the horizontal reciprocatory bottom unit.

12. An apparatus for classifying solids of a liquid-solids mixture constituting a classifying bath, which apparatus comprises in combination a boundary wall for marginally defining said bath; a pressure chamber structure having a top perforated plate for defining the lower limits of the bath; which said plate is spacedly disposed beneath said wall whereby there is left a sands-transfer passage area wherein there is maintained a sealing body of progressively-changing outwardly-moving sands provided by coarse classified solids; means for feeding solids to be classified to said bath; means providing water under pressure to the pressure chamber structure and from which the water is forced upwardly through the perforations of the plate into the overlying bath; means providing an overflow weir by which supernatant liquid with suspended solids therein are released from the bath to a region outside of the apparatus and which overflow means determines the normal surface level of the bath; a tank structure surrounding said boundary wall and providing a liquid-holding space into which the fixed boundary wall extends and within which said chamber structure is located so that the top perforated plate thereof is submergedly disposed; means for supplying water to the tank that is delivered to a region exteriorly located with respect to said movable pressure chamber structure; means for imparting oscillating movements to the perforated plate in horizontal paths paralleling the lower portion of the boundary wall whereat the sands-transfer area is located without imparting vertical movements to the plate and whereby as the apparatus functions classified sands will progressively cascade in submergence from the body of sealing sands into the tank; means comprising an overflow weir for releasing unburdened liquid from an upper portion of the tank, which last mentioned weir is higher than that of the lower edge portion of the boundary wall; and means for removing to emergence cascaded sands that settle within the tank.

13. An apparatus of the class described comprising means providing a main structure; a liquid-holding tank fixedly secured in place as part of the main structure; an outflow means leading from the tank and having an unburdened-liquid overflow weir determining the normal surface level of the liquid within the tank; an apertured bottom member defining the lower limits of a liquid-solids classifying bath and serving as a flow constriction plate; a pressure pan connected to said bottom member whereby to provide within the pan and immediately below said bottom member a pressure chamber from which hydraulic water can be upwardly passed into and through the apertures which constitute flow constriction openings through the bottom member; means by which said bottom member and pressure pan connected thereto are movably supported as a unit and in a manner whereby they are located within the main tank at elevation lower than that of the aforementioned unburdened-liquid overflow weir; means leading from a locality outside of said tank to the interior of the pan for supplying water under pressure to the chamber within the pan; valve-controlled means leading from the lower interior portion of the pan to a locality outside of the tank by which there may be discharged such solids as may gravitate through said apertures into the pan; a boundary wall fixed to and carried by said main structure and disposed above and with respect to said bottom member so as to leave between the lower edge portion of the boundary wall and above the underlying portion of said bottom member a sands-transfer passageway wherein a sealing body of progressively-changing outwardly-moving sands is maintained on the bottom and so as to extend upwardly into engagement with said lower edge portion of said boundary wall whereby a receiving and holding space is completed for the liquid-solids classifying bath which is defined as to its lower limits by the apertured bottom member and which is marginally defined by said boundary wall and said sealing sands; means for delivering material embodying solids to be classified into said classifying bath; the disposition of said apertured bottom member and of the boundary wall overlying the same being such that classified coarse solids constituting said sands pass outwardly from said sealing body into the liquid-holding portion of the main tank wherein they settle; means for passing settled sands from the interior portion of the main tank; means providing a slimes-overflow weir past which supernatant liquid bearing suspended solids is released from the classifying bath and which slimes-overflow weir determines the normal surface level of the classifying bath; and means associated with said main structure on the one hand and with the unit which comprises said movable bottom member and pressure pan connected thereto on the other hand for imparting back and forth movements to said unit whereby each portion of the bottom member underlying the sands seal has repetitive back and forth movements relative to and paralleling the overlying boundary wall which is fixedly secured to the main structure.

14. A solids classification apparatus comprising in operative combination and arrangement a horizontally-extending perforated constriction plate providing a horizontally-movable bottom member; means for supporting said bottom member so that the constriction plate provided thereby can have horizontal back and forth movements without having any substantial vertical movement imparted thereto; a stationary boundary wall overlying said bottom member for providing within said wall as an outer margin and over said constriction plate as a lower limit defining member a liquid-solids receiving zone within which a bath containing solids to be classified is located, which said boundary wall is constructed so as to provide between the upper portion of said bottom member and an overlying bottom edge portion of the boundary wall a sands-transfer passageway; a ledge member outwardly and spacedly disposed with respect to the boundary wall and rising with respect to said constriction plate for serving as an outer barrier providing a low sands weir whereby within said transfer passageway there is maintained a sealing body of progressively-changing outwardly-moving sands resting on the bottom member and extending upwardly into engagement with the overlying lower edge portion of the boundary wall; means for supplying to said bath liquid-solids to be classified; means providing an overflow weir past which supernatant liquid with solids suspended therein is released from the apparatus and whereby the elevation of the weir of said means determines the normal surface elevation of the liquid in the classifying bath; and means for imparting back and forth horizontal movements to said horizontally-extending perforated constriction plate the path of which in direction parallels such lower portion of the overlying boundary wall as is engaged by the sealing sands rising thereto.

15. An apparatus of the class described comprising means providing a main structure; a supporting bearing carried by said main structure; an apertured bottom member defining the lower limits of a classifying bath and providing flow constriction openings directed toward the classifying bath; a supported movable bearing member seated on the supporting bearing member and connected to said bottom member whereby said bottom member and said supported bearing member move as a unit deriving support from said supporting bearing member; a stationary boundary wall fixed to and carried by said main structure and disposed above and spacedly with respect to said bottom member to provide a sands-transfer area between them; means providing a barrier outwardly disposed with respect to the boundary wall and functioning as a sands-resisting ledge for thereby maintaining in said passage area a sealing body of progressively-changing outwardly-moving sands immediately overlying said marginal portion of said bottom member and extending upwardly into engagement with the immediately overlying vertically spaced lower edge portion of the boundary wall whereby a liquid-solids receiving and holding zone is completed that provides a zone for the classifying bath that is defined as to its lower limits by the bottom member and which is marginally defined by said boundary wall and the sealing sands in the sands-transfer area, which sands-resisting ledge functions as a low sands weir to permit the ultimate release and passage of sands from said sealing body of progressively-changing outwardly-moving sands; means for supplying water under pressure to said bottom member for ultimate delivery through and from said flow constriction openings; means for delivering into said zone material embodying solids to be classified; means providing an overflow weir past which supernatant liquid bearing suspended solids released from said zone and which overflow weir determines the normal elevation of the liquid-solids material constituting the classifying bath within said zone and means associated with said main structure and with the unit for imparting back and forth movements to the bottom member in directions whereby the latter has repetitive back and forth movement in directions paralleling that of the vertically spaced lower portion of the overlying wall engaged by the sealing sands within said transfer area.

WILLIAM CHAMBERS WEBER.